US012374326B1

(12) United States Patent
Potamianos et al.

(10) Patent No.: US 12,374,326 B1
(45) Date of Patent: Jul. 29, 2025

(54) NATURAL LANGUAGE GENERATION

(71) Applicant: Amazon Technologies, Inc., Seattle, WA (US)

(72) Inventors: Alexandros Potamianos, Santa Monica, CA (US); Arijit Biswas, Dublin, CA (US); Bonan Zheng, Torrance, CA (US); Anushree Venkatesh, San Mateo, CA (US); Yohan Jo, Sunnyvale, CA (US); Vincent Auvray, Scotts Valley, CA (US); Nikolaos Malandrakis, San Jose, CA (US); Aaron Challenner, Melrose, MA (US); Xinyan Zhao, Seattle, WA (US); Angeliki Metallinou, Mountain View, CA (US); David A Jara, Normandy Park, WA (US); Jiahui Li, Sunnyvale, CA (US); Ying Shi, Bellevue, WA (US); Nikko Strom, Kirkland, WA (US); Veerdhawal Pande, Walpole, MA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 18/141,051

(22) Filed: Apr. 28, 2023

(51) Int. Cl.
*G10L 15/18* (2013.01)
*G10L 15/22* (2006.01)

(52) U.S. Cl.
CPC .......... *G10L 15/1815* (2013.01); *G10L 15/22* (2013.01); *G10L 2015/223* (2013.01)

(58) Field of Classification Search
CPC ................ G10L 15/1815; G10L 15/22; G10L 2015/223

(Continued)

(56) References Cited

U.S. PATENT DOCUMENTS 11,250,855 B1 * 2/2022 Vozila .................. G06F 40/284
12,112,751 B2 * 10/2024 Kim ..................... G10L 15/1815

(Continued)

OTHER PUBLICATIONS

Andreas, et al., "Task-Oriented Dialogue as Dataflow Synthesis", Transactions of the Association for Computational Linguistics, 2020, vol. 8, p. 556-571.

(Continued)

*Primary Examiner* — Abul K Azad
(74) *Attorney, Agent, or Firm* — Pierce Atwood LLP

(57) ABSTRACT

Techniques for determining when speech is directed at another individual of a dialog, and storing a representation of such user-directed speech for use as context when processing subsequently-received system-directed speech are described. A system receives audio data and/or video data and determines therefrom that speech in the audio data is user-directed. Based on this, the system determine whether the speech is able to be used to perform an action by the system. If the speech is able to be used to perform an action, the system stores a natural language representation of the speech. Thereafter, when the system receives system-directed speech, the system generates a rewrite of a natural language representation of the system-directed speech based on the previously-received user-directed speech. The system then determines output data responsive to the system-directed speech using the rewritten natural language representation.

20 Claims, 11 Drawing Sheets

(58) Field of Classification Search
USPC .......................................................... 704/275
See application file for complete search history.

(56) References Cited

U.S. PATENT DOCUMENTS

| | | | |
|---|---|---|---|
| 2012/0035931 A1* | 2/2012 | LeBeau | G06F 3/167 |
| | | | 704/E15.005 |
| 2013/0144616 A1* | 6/2013 | Bangalore | G10L 15/25 |
| | | | 704/226 |
| 2023/0410801 A1* | 12/2023 | Mishra | H04L 51/02 |

OTHER PUBLICATIONS

Chen, et al., "DialogSum: A Real-Life Scenario Dialogue Summarization Dataset", Findings of the Association for Computational Linguistics: ACL-IJCNLP, 2021, p. 5062-5074.

Feigenblat, et al., "TWEETSUMM—A Dialog Summarization Dataset for Customer Service", Findings of the Association for Computational Linguistics: EMNLP, 2021, p. 245-260.

Gliwa, et al., "SAMSum Corpus: A Human-annotated Dialogue Dataset for Abstractive Summarization", Proceedings of the 2nd Workshop on New Frontiers in Summarization, 2019, p. 70-79.

Krishna, et al., "Generating SOAP Notes from Doctor-Patient Conversations Using Modular Summarization Techniques", Proceedings of the 59th Annual Meeting of the Association for Computational Linguistics and the 11th International Joint Conference on Natural Language Processing (vol. 1: Long Papers), 2021, p. 4958-4972.

Lewis, et al., "BART: Denoising Sequence-to-Sequence Pretraining for Natural Language Generation, Translation, and Comprehension", 2019, https://arxiv.org/abs/1910.13461.

Li, et al., "DailyDialog: A Manually Labelled Multi-turn Dialogue Dataset", Proceedings of the Eighth International Joint Conference on Natural Language Processing (vol. 1: Long Papers), Asian Federation of Natural Language Processing, Taipei, Taiwan, 2017, p. 986-995.

Lin, "Rouge: A Package for Automatic Evaluation of Summaries", Text Summarization Branches Out, Association for Computational Linguistics, Barcelona, Spain, 2004, p. 74-81.

Lin, et al., "Csds: A Fine-Grained Chinese Dataset for Customer Service Dialogue Summarization", Proceedings of the 2021 Conference on Empirical Methods in Natural Language Processing, 2021, p. 4436-4451.

Lin, et al., "Other Roles Matter! Enhancing Role-Oriented Dialogue Summarization via Role Interactions", Proceedings of the 60th Annual Meeting of the Association for Computational Linguistics (vol. 1: Long Papers), 2022, p. 2545-2558.

Lui, et al., "Automatic Dialogue Summary Generation for Customer Service", Proceedings of the 25th ACM SIGKDD International Conference on Knowledge Discovery & Data Mining, 2019, p. 1957-1965.

Porcheron, et al., "Voice Interfaces in Everyday Life", Proceedings of the 2018 CHI Conference on Human Factors in Computing Systems, 2018, p. 1-12.

Radford, et al., "Language Models are Unsupervised Multitask Learners", Technical report, 2019.

Raffel, et al., "Exploring the Limits of Transfer Learning with a Unified Text-to-Text Transformer", 2019, https://arxiv.org/abs/1910.10683.

Rastogi, et al., "Towards Scalable Multi-Domain Conversational Agents: The Schema-Guided Dialogue Dataset", Proceedings of the AAAI Conference on Artificial Intelligence, 2020, vol. 34, No. 5, p. 8689-8696.

Wolf, et al., "Transformer: State-of-the-art Natural Language Processing", Proceedings of the 2020 Conference on Empirical Methods in Natural Language Processing: System Demonstrations, Association for Computational Linguistics, 2020, p. 38-45.

Young, et al., "Fusing task-oriented and open-domain dialogues in conversational agents", 2021, https://arxiv.org/abs/2109.04137.

Zang, et al., "MultiWOZ 2.2 : A Dialogue Dataset with Additional Annotation Corrections and State Tracking Baselines", Proceedings of the 2nd Workshop on Natural Language Processing for Conversational AI, 2020, p. 109-117.

Zhang, et al., "EmailSum: Abstractive Email Thread Summarization", Proceedings of the 59th Annual Meeting of the Association for Computational Linguistics and the 11th International Joint Conference on Natural Language Processing (vol. 1: Long Papers), p. 6895-6909.

Zhao, et al., "TODSum: Task-Oriented Dialogue Summarization with State Tracking", 2021, https://arxiv.org/abs/2110.12680.

Zhong, et al., "QMSum: A New Benchmark for Query-based Multi-domain Meeting Summarization", Proceedings of the 2021 Conference of the North American Chapter of the Association for Computational Linguistics: Human Language Techologies, 2021, p. 5905-5921.

Feng, et al., "A Survey on Dialogue Summarization: Recent Advances and New Frontiers", Proceedings of the Thirty-First International Joint Conference on Artificial Intelligence, 2022, p. 5453-5460.

Feng, et al., "Language Model as an Annotator: Exploring DialoGPT for Dialogue Summarization", Proceedings of the 59th Annual Meeting of the Association for Computational Linguistics and the 11th International Joint Conference on Natural Language Processing (vol. 1: Long Papers), 2021, p. 1479-1491.

Lin, et al., "Dialog Simulation with Realistic Variations for Training Goal-Oriented Conversational Systems", Human in the Loop Dialogue Systems Workshop (HLDS), 2020.

Song, et al., "Summarizing Medical Conversations via Identifying Important Utterances", Proceedings of the 28th International Conference on Computational Linguistics, 2020, p. 717-729.

Vakulenko, et al., "Question Rewriting for Conversational Question Answering", Proceedings of the 14th ACM International Conference on Web Search and Data Mining, 2021, p. 355-363.

Yu, et al., "Few-Shot Generative Conversational Query Rewriting", Proceedings of the 43rd International Acm Sigir Conference on Research and Development in Information Retrieval, 2020, p. 1933-1936.

Zamani, et al., "Conversational Information Seeking", 2022, arXiv:2201.08808.

Zhao, et al., "Domain-Oriented Prefix-Tuning: Towards Efficient and Generalizable Fine-tuning for Zero-Shot Dialogue Summarization", Proceedings of the 2022 Conference of the North American Chapter of the Association for Computational Linguistics: Human Language Technologies, 2022, p. 4848-4862.

\* cited by examiner

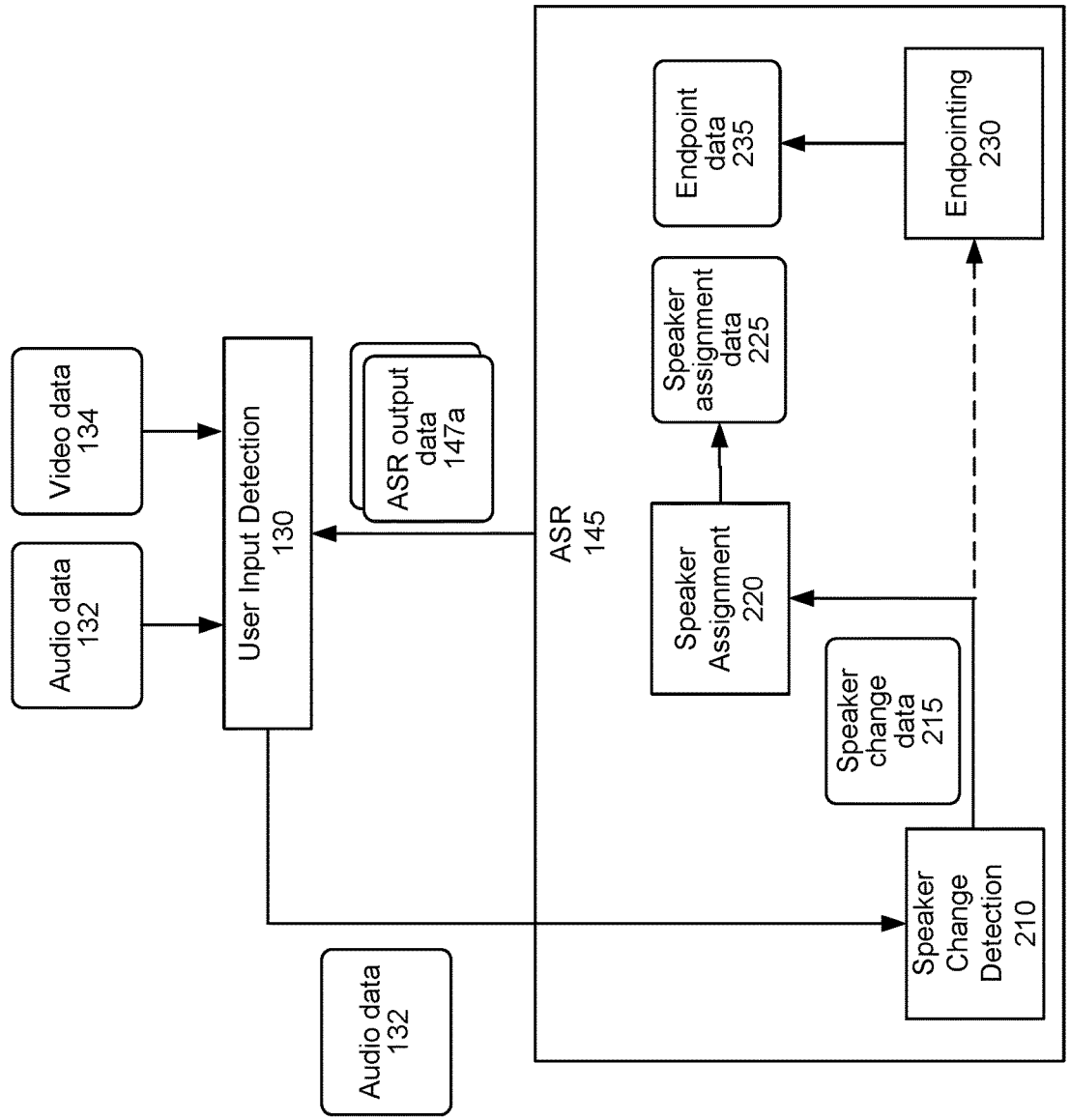

NATURAL LANGUAGE GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram illustrating example automatic speech recognition (ASR) sub-components for determining when speech is spoken by more than one individual, according to embodiments of the present disclosure.

DETAILED DESCRIPTION

Figure 1A:
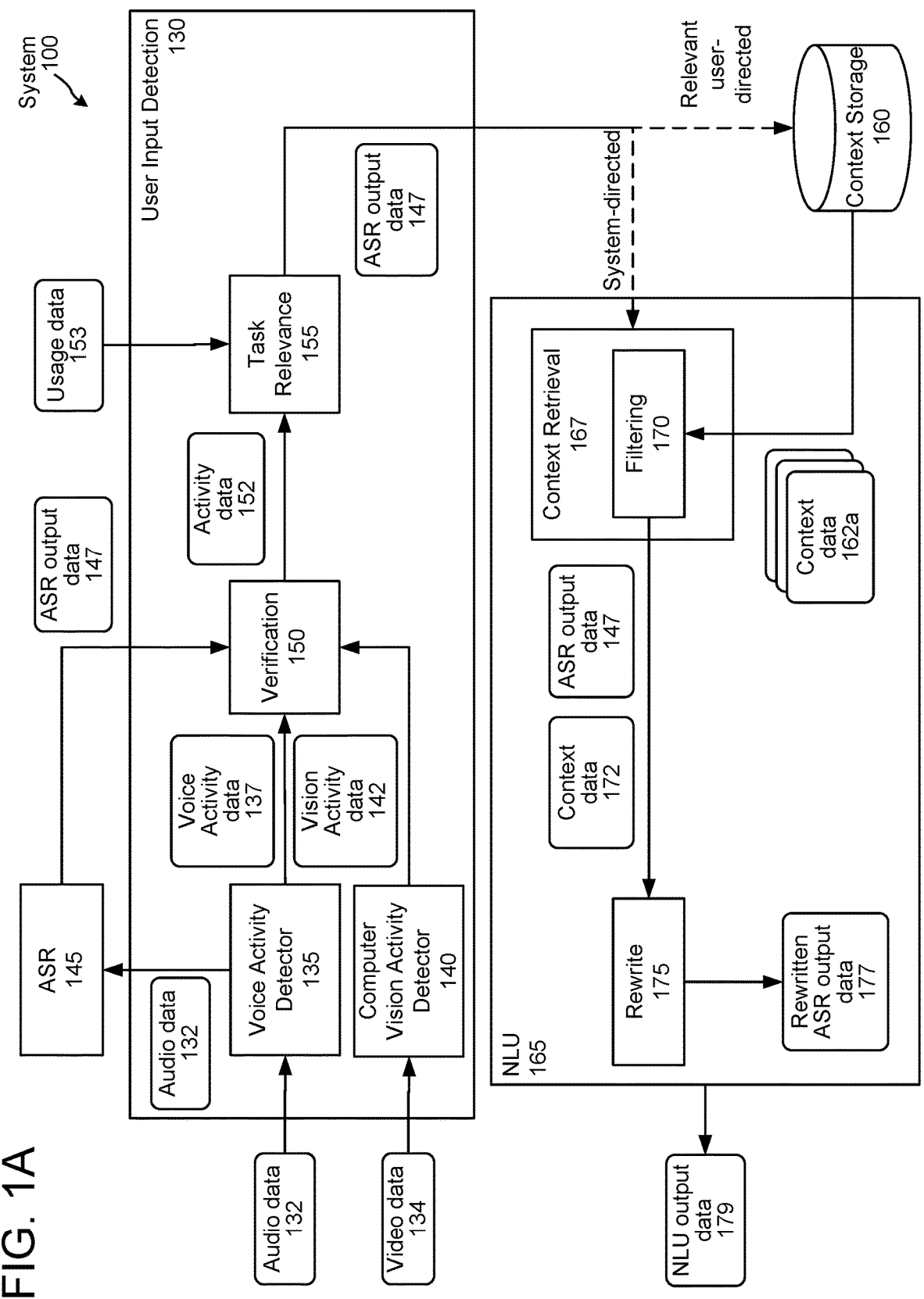
FIG. 1A is a conceptual diagram illustrating example components for generating a contextualized natural language understanding (NLU) output for system-directed speech, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

With user permission, a system may process to detect speech of individuals surrounding one or more user devices, and may process the speech to determine whether the speech is directed at the system. As used herein, "system-directed speech" and the like refer to speech of an individual that the system determines the individual intends for the system to process in an attempt to perform a responsive action. For example, the system may detect the system-directed speech "what is today's weather," and in response thereto may output weather information for the user's geographic location. As another example, the system may detect the system-directed speech "what are today's top stories," and in response thereto may output one or more news stories. As a further example, the system may detect the system-directed speech "can you recommend me a movie," and in response thereto may output one or more movie suggestions. As such, it will be appreciated that system-directed speech may be in the form of a statement or question, and may correspond to one or more of a plurality of topics.

The present disclosure provides, among other things and with user permission, techniques for determining when speech is directed at another individual (sometimes referred to herein as "user-directed speech"), and storing a representation of such user-directed speech for use as context when processing subsequently-received system-directed speech. For example, a representation of user-directed speech may be used to resolve anaphora (e.g., "it," "they," "her," and/or other ambiguous words relating to an entity explicitly referred to previously in a dialog) in subsequently-received system-directed speech. Examples of user-directed speech detected during a dialog to order food include "I'll take the bacon cheeseburger," "On second thought, can I have mine with the dressing on the side," "I think we should order from <restaurant name>," and the like.

In some instances, a system of the present disclosure may selectively store a representation of user-directed speech when the system determines the user-directed speech may be relevant to future system-directed speech. Thus, a system of the present disclosure may strategically not store user-directed speech that is part of a dialog and which the system determines is not likely usable in the processing later-received system-directed speech of the dialog.

For example, a system may be participating in a dialog involving two or more users discussing take-out orders from a restaurant. At a first time, the system may detect the speech "I think I am going to get the chicken Caesar salad." The system may determine that the speech is user-directed (i.e., directed from one user of the dialog to one or more other users of the dialog), and may store a representation (e.g., ASR output data) of the user-directed speech based on the system determining the user-directed speech is potentially relevant to processing future system-directed speech (e.g., requesting the ordering of food). Sometime thereafter, but during the same dialog, the system may receive the speech "Can you order that?" The system may determine this speech to be system-directed and, based thereon identify the stored representation of the user-directed speech and use the representation to resolve "that" in the system-directed speech to "chicken Caesar salad."

As used herein, a "dialog" may refer to multiple related user inputs and system outputs between a system and two or more users. The data associated with a dialog may be associated with a same dialog identifier, which may be used by components of the system to associate information across the dialog. User inputs of the same dialog may or may not start with the speaking of a wakeword. Each user input may be associated with a different user input identifier, and each user input identifier may be associated with a corresponding dialog identifier. A dialog may include spoken user inputs and/or non-natural language inputs (e.g., image data, user-performed gestures, button presses, etc.). For example, a user may open a dialog with the system to request a food delivery in a spoken utterance and the system may respond by displaying images of food available for order and the user or another user of the dialog may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

A system of the present disclosure may receive, from a device, first input audio corresponding to first speech of a first user. The system may perform ASR processing using the first input audio to determine a first ASR output comprising a first transcript of the first speech. Based on the first input audio and the first ASR output, the system may determine the first speech is directed at a second user instead of the device. The system may determine information included in the first speech is usable to respond to speech directed to the device. Based on determining the information included in the first speech is usable to respond to the speech directed to device is capable of presenting the first output responsive to the first speech, the system may send the first ASR output to a storage. After sending the first ASR output to the storage, the system may receive, from the device, second input audio corresponding to second speech. The system may perform ASR processing using the second input audio to determine a second ASR output comprising a second transcript of the second speech. Based on the second ASR output, the system may determine the second speech is directed to the device. Based on determining the second speech is directed at the device, the system may receive the first ASR output from the storage. After receiving the first ASR output from the storage, the system may determine a rewritten ASR output corresponding to the second ASR output updated to include at least one word from the first ASR output. The system may perform NLU processing using the rewritten ASR output to determine a NLU output comprising an intent corresponding to the second speech. Based on the NLU output, the system may determine a second output responsive to the second speech. The system may cause presentation of the second output.

In some embodiments the system may receive a first input image corresponding to at least a first image representing the first user, where the system may determine the first speech is directed at the second user instead of the device based on the first input image. The system may receive second input image corresponding to at least a second image representing the first user, where the system may determine the second speech is directed at the device is further based on the second input image.

In some embodiments, based on determining the second speech is directed at the device, the system may receive, from the storage, a third ASR output comprising a third transcript of third speech, where the third speech was received prior to the first speech, and the third ASR output was stored based on the third speech being directed at a third user instead of the device. The system may determine the second ASR output is semantically similar to the first ASR output instead of the third ASR output, where the rewritten ASR output includes the at least one word from the first ASR output instead of the third ASR output based on the second ASR output being semantically similar to the first ASR output instead of the third ASR output.

In some embodiments, the system may determine usage data including a third ASR output corresponding to third speech of a dialog. The system may determine the first speech is semantically similar to the third speech, where the system may send the first ASR output to the storage based on the first speech being semantically similar to the third speech.

A system of the present disclosure may receive, from a device, first input audio corresponding to first speech of a first user. The system may determine the first speech is directed at the device. Based on determining the first speech is directed at the device, the system may receive, from a storage, a transcript of second speech, where the second speech was received prior to the first speech, and the transcript was stored based on the second speech being directed at a second user instead of the device. After receiving the transcript from the storage, the system may determine first natural language data corresponding to the first speech updated to include at least one word from the second speech. The system may perform NLU processing using the first natural language data to determine an NLU output comprising a first intent corresponding to the first speech and/or the second speech. Based on the NLU output, the system may determine a first output responsive to the first speech and/or the second speech. The system may cause presentation of the first output.

In some embodiments, the system may, prior to receiving the first input audio data, receive second input audio corresponding to the second speech. The system may determine the second speech is directed at the second user instead of the device. The system may determine information included in the second speech is usable to respond to speech directed to the device. Based on determining the information included in the second speech is usable to respond to the speech directed to the device, the system may send the transcript of the second speech to the storage.

In some embodiments, the system may determine an entity referenced in the second speech. The system may determine the entity corresponds to an entity type capable of being processed using NLU processing, where the system determining the information included in the second speech is usable to respond to the speech directed to the device is based on the entity corresponding to the entity type.

In some embodiments, the system may receive an input image corresponding to at least a first image representing the first user, where the system may determine the first speech is directed at the device based on the input image.

In some embodiments, based on determining the first speech is directed at the device, the system may receive, from the storage, a second transcript of third speech, where the third speech was received prior to the first speech, and the second transcript was stored based on the third speech being directed at a third user instead of the device. The system may determine the first speech is semantically similar to the second speech, instead of the third speech, where the first natural language data includes the at least one word from the second speech, instead of the third speech based on the first speech being semantically similar to the second speech, instead of the third speech.

In some embodiments, the system may determine usage including a second transcript of third speech. The system may determine the second speech is semantically similar to the third speech, where the system may send the second speech to the storage based on the second speech being semantically similar to the third speech.

In some embodiments, the system may receive third input audio corresponding to third speech. The system may determine a first portion of the third speech was spoken by the first user. The system may determine a second portion of the third speech was spoken by the second user. The system may determine the first portion of the third speech is directed at the device. The system may determine the second portion of the third speech is directed at the first user.

In some embodiments, the system may determine the second speech was spoken by the first user. Based on the second speech being spoken by the first user, the system may determine the first output to include a name of the first user.

Teachings of the present disclosure provide, among other things, an improved user experience by enabling a system to differentiate between "relevant" user-directed speech (i.e., user-directed speech that may be usable to process and respond to subsequently-received system-directed speech of a dialog), and "irrelevant" user-directed speech (i.e., user-directed speech that is unable to be used to process and respond to subsequently-received system-directed speech of a dialog). By enabling the system to differentiate between relevant and irrelevant user-directed speech, the system is able to process and respond to at least some system-directed speech that the system would otherwise be unable to respond to. Moreover, the system being configured to differentiate between relevant and irrelevant user-directed speech helps ensure that the system does not store representations of user-directed speech that users would likely not want the system to store (e.g., speech including sensitive information such as personally identifiable information, confidential information, financial information, medical information, offensive language, etc.)

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates components of a system 100 capable of participating in a dialog with two or more users, where the components are configured to generate a contextualized NLU output for system-directed speech. As shown in FIG. 1A, the system 100 may include a user input detection component 130, a NLU component 165, and a context storage 160. The user input detection component 130 may include a voice activity detector (VAD) component 135, a computer vision activity detector (CVAD) component 140, a verification component 150, and a task relevance component 155. The NLU component may include a context retrieval component 167 and a rewrite component 175.

Figure 5:
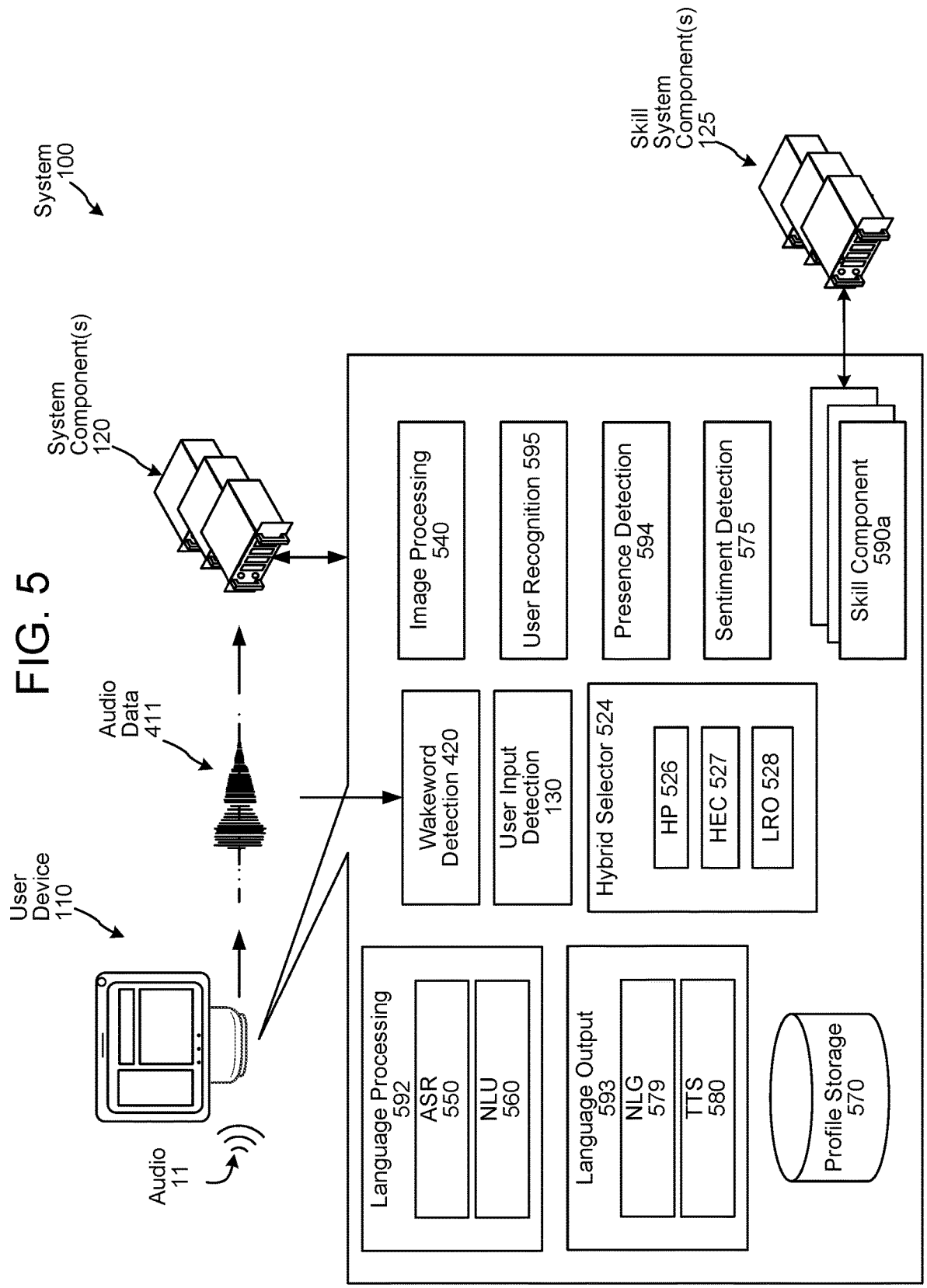
FIG. 5 is a conceptual diagram illustrating components that may be included in a user device, according to embodiments of the present disclosure.
Figure 8:
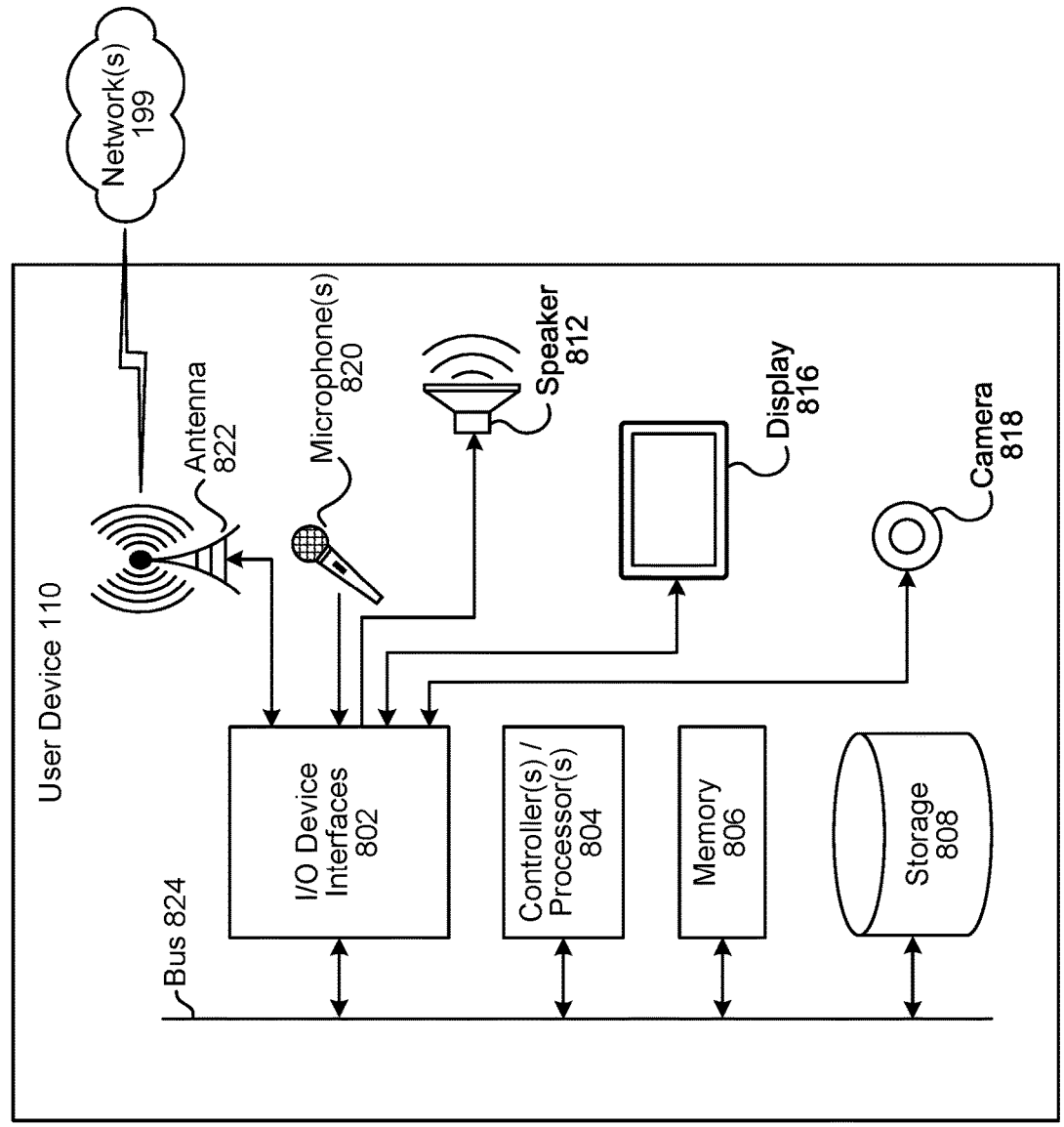
FIG. 8 is a block diagram conceptually illustrating example components of a user device, according to embodiments of the present disclosure.

The user input detection component 130 may receive audio data 132 and/or video data 134 from a user device 110 illustrated in and described with respect to FIGS. 5 and 8. For example, one or more microphones of or associated with the user device 110 may capture an audio signal(s), corresponding to speech of a user, and transduce the audio signal(s) into the audio data 132. Further, one or more cameras of or associated with the user device 110 may capture one or more images of one or more users proximate to the user device 110. The user device 110 may send the audio data 132 and video data 134, corresponding to the one or more images, to the user input detection component 130 either directly or indirectly via one or more components of the system 100.

The present disclosure is not intended to be limited to any particular manner for transducing audio signals into the audio data 132. Rather, it is envisioned that any already or yet to be discovered art- and/or industry-known transducing technique may be used in accordance with the present disclosure.

In some situations, the audio data 132 may correspond to system-directed speech. For example, the system-directed speech may be "can you place an order for that," "can you recommend me a movie," "Play music in there," "Turn on the TV," "which of those do you recommend," or some other speech directed to the system. In other situations, the audio data 132 may correspond to user-directed speech. For example, the user-directed speech may be "I'll take the bacon cheeseburger," "I want to watch an action movie," "On second thought, can I have mine with the dressing on the side," "Want to put the game on," "I think we should play some country music," "I think we should order from <restaurant name>," or some other speech directed from a user of a dialog to one or more other users of the dialog. In even further situations, the audio data 132 may correspond to speechless background audio.

The VAD component 135, of the user input detection component 130, receives the audio data 132 and determines whether the audio data 132 includes speech. In situations where the VAD component 135 determines the audio data 132 includes speech, the VAD component 135 effectively determines further processing is to be performed with respect to the audio data 132. In situations where the VAD component 135 determines the audio data 132 does not include speech, the VAD component 135 effectively determines no further processing is to be performed with respect to the audio data 132. If the audio data 132 is determined to include speech, the VAD component 135 may further determine whether the speech is system- or user-directed.

The VAD component 135 outputs voice activity data that indicates whether the audio data 132 includes speech and, if the audio data 132 includes speech, may optionally indicate whether the speech is system- or user-directed. The voice activity data 137 may represent whether speech is system- or user-directed using a binary indicator, where a first value (e.g., 1) indicates the speech is system-directed speech, and a second value (e.g., 0) indicates the speech is user-directed. Alternatively, the voice activity data 137 may indicate whether speech is system- or user-directed using a probability score (e.g., a number on a scale between 0 and 1). Further description of the processing of the VAD component 135 to generate the voice activity data 137 is provided herein below with respect to FIG. 3.

As discussed above, the VAD component 135 may determine the audio data 132 does not include speech, and the VAD component 135 may cause the system 100 to discontinue processing with regard to the audio data 132, thereby saving computing resources that might otherwise have been spent on other processes (e.g., ASR for the audio data 132, etc.). If the VAD component 135 determines the audio data 132 includes speech, the VAD component 135 may cause the audio data 132 to be sent to an ASR component 145, in addition to outputting the voice activity data 137, regardless of whether the VAD component 135 determines the speech in the audio data 132 to be system- or user-directed.

The ASR component 145 processes the audio data 132 to generate ASR output data 147 including a transcript of the speech represented in the audio data 132. The ASR output data 147 may include the transcript in the form of text data, tokenized data, or some digitized representation of the analog speech in the audio data 132. Further details of the processing of the ASR component 145 are described herein below in connection with FIGS. 2 and 4. The ASR component 145 may cause the ASR output data 147 to be sent to the verification component 150.

In some situations, the user input detection component 130 may receive audio data 132 but not video data 134, for example when the user device 110 does not have or is not associated with a camera. In other situations, the user input detection component 130 may receive the audio data 132 and the video data 134, where the audio data 132 and video data 134 correspond to audio and one or more images, respectively, captured over the same time frame such that the video data 134 is a visual representation of the audible environment represented in the audio data 132.

In situations where the user input detection component 130 receives the video data 134, the CVAD component 140 processes the video data 134 to determine whether the content in the video data 134 is system- or user-directed (e.g., whether the video data 134 indicates speech, in the corresponding audio data 132, is system- or user-directed). The CVAD component 140 may process in series to, in parallel to, or at least partially in parallel to the VAD component 135.

The video data 134 may correspond to one or more images. In some embodiments, the one or more images may correspond to one or more frames of a video taken over a consecutive duration of time. For example, the video data 134 may include image data captured by the user device 110 and/or image data captured by one or more other devices of the system 100.

In some embodiments, the system 100 may include a component configured to timestamp or otherwise correlate the audio data 132 and the video data 134 so that the user input detection component 130 may determine that the data being analyzed all relates to a same time so as to ensure alignment of data when considering whether speech is system- or user-directed. For example, the user input detection component 130 may determine a system-directedness score for each frame of audio data and video data and may align them to determine a single overall score temporally corresponding frames of the audio and video data.

The CVAD component 140 processes the video data 134 to generate vision activity data 142 indicating whether the image(s) in the video data 134 corresponds to system- or user-directed behavior. An image that corresponds to system-directed behavior may include, for example, an image depicting one or more users looking at the user device 110, one or more users looking at the user device 110 while moving their mouths (e.g., in a manner that coincides with the speech of the audio data 132), etc. In contrast, an image that corresponds to user-directed behavior may include, for example, an image depicting one or more users facing away from the user device 110, one or more users facing towards each other, one or more users facing towards each other while moving their mouths (e.g., in a manner that coincides with the speech of the audio data 132) may also correspond to user-directed behavior, etc. The vision activity data 142 may representing whether the image(s) corresponds to system- or user-directed behavior using a binary indicator, where a first value (e.g., 1) indicates the image(s) corresponds to system-directed behavior, and a second value (e.g., 0) indicates the image(s) corresponds to user-directed behavior. Alternatively, the vision activity data 142 may indicate whether the image(s) corresponds to system- or user-directed behavior using a probability score (e.g., a number on a scale between 0 and 1). Further description of the processing of the CVAD component 140 to generate the vision activity data 142 is provided herein below with respect to FIG. 3.

The verification component 150 may process the voice activity data 137, the vision activity data 142 (i.e., in situations when video data 134 is received), and the ASR output data 147 to make another determination as to whether the speech in the audio data 132 is system- or user-directed. In situations where the verification component 150 determines the speech is system- or user-directed, the verification component 150 effectively determines further processing is to be performed with respect to the speech. In situations where the verification component 150 determines the speech is not system- or user-directed, the verification component 150 effectively determines no further processing is to be performed with respect to the speech.

In addition to processing the voice activity data 137 and the ASR output data 147, and the vision activity data 142 in situations where the video data 134 is received and processed, the verification component 150 may process other data corresponding to the speech (e.g., image feature vector 336, audio feature vector 331, the video data 134, the audio data 132, and/or other contextual data that can be used to inform whether the speech is system- or user-directed). The verification component 150 may include one or more trained machine learning models that may analyze the various data noted above to make a determination regarding the system-directedness of the speech.

The model(s) of the verification component 150 may be trained on various positive and negative training examples of data (e.g., voice activity data, vision activity data, ASR output data, etc.) so the trained model(s) of the verification component 150 may be capable of robustly detecting when speech is system- or user-directed.

In situations where the ASR output data 147 includes at least one hypothesis satisfying a condition (e.g., having a confidence score satisfying a threshold confidence score), that may indicate that the speech represented in the audio data 132 is directed at, and intended for, the user device 110. If, however, the ASR output data 147 does not include any hypotheses satisfying the condition, that may indicate some confusion on the part of the ASR component 145 and may also indicate that the speech represented in the audio data 132 was not directed at, nor intended for, the user device 110.

The ASR output data 147 may include complete ASR output data, for example ASR output data corresponding to all speech between start and endpoints of non-speech. In this situation, the system 100 may wait until all ASR processing for a certain input audio has been completed before operating the feature extractor/the verification component 150. Thus, the verification component 150 may process using a feature vector that includes all the representations of the audio data 132 created by the feature extractor. The verification component 150 may then operate a trained model (such as a DNN) on the feature vector, the voice activity data 137, and the vision activity data 142 to determine a score corresponding to a likelihood that the speech is system-directed. If the score is above a threshold, the verification component 150 may determine that the speech is system-directed. If the score is below a threshold, the verification component 150 may determine that the speech is not system-directed, and instead may determine that the speech is user-directed.

The ASR output data 147 may also include incomplete ASR results, for example ASR results corresponding to only some speech between a startpoint and endpoint (such as an incomplete lattice, etc.). In this configuration the feature extractor/verification component 150 may be configured to operate on incomplete ASR output data 147 and thus the verification component 150 may be configured to output the activity data 152 that provides an indication as to whether the portion of audio data processed (that corresponds to the incomplete ASR results) corresponds to system-directed, relevant user-directed speech, or irrelevant speech. The system 100 may thus be configured to perform ASR processing at least partially in parallel with the verification component 150 to process ASR output data as it is ready and thus continually update the activity data 152. Once the verification component 150 has processed enough ASR output and/or the activity data 152 exceeds a threshold, the system 100 may determine that the speech is system-directed.

The verification component 150 may output activity data 152 including the ASR output data 147 and indicating whether the verification component 150 determined the speech in the audio data 132 to be system- or user-directed. The activity data 152 may include a score (e.g., a number between 0 and 1) indicating whether the speech is system- or user-directed. The activity data 152 may be associated with a same unique identifier as the audio data 132, voice activity data 137, video data 134, vision activity data 142, and/or ASR output data 147 for purposes of tracking system processing across various components.

In one example the determination of the verification component 150 may be based on "AND" logic, for example determining speech is system-directed only if the voice activity data 137 and the vision activity data 142 (in situations where the video data 134 is received and processed), and the verification component 150 determines the ASR output data 147 indicates the speech is system-directed. In another example, the determination of the verification component 150 may be based on "OR" logic, for example determining speech is system-directed if the voice activity data 137 indicates the speech is system-directed, or the vision activity data 142 indicates the speech is system-directed, or the verification component 150 determines that the ASR output data 147 indicates the speech is system-directed. As another example, the determination of the verification component 150 may be based on determining that a majority of the data (e.g., the voice activity data 137, the vision activity data 142, and the ASR output data 147) indicates the speech is system-directed. In some embodiments, the data received from the VAD component 135, the CVAD component 140, and the ASR component 145 may be individual weighted when processed by the verification component 150.

Figure 4:
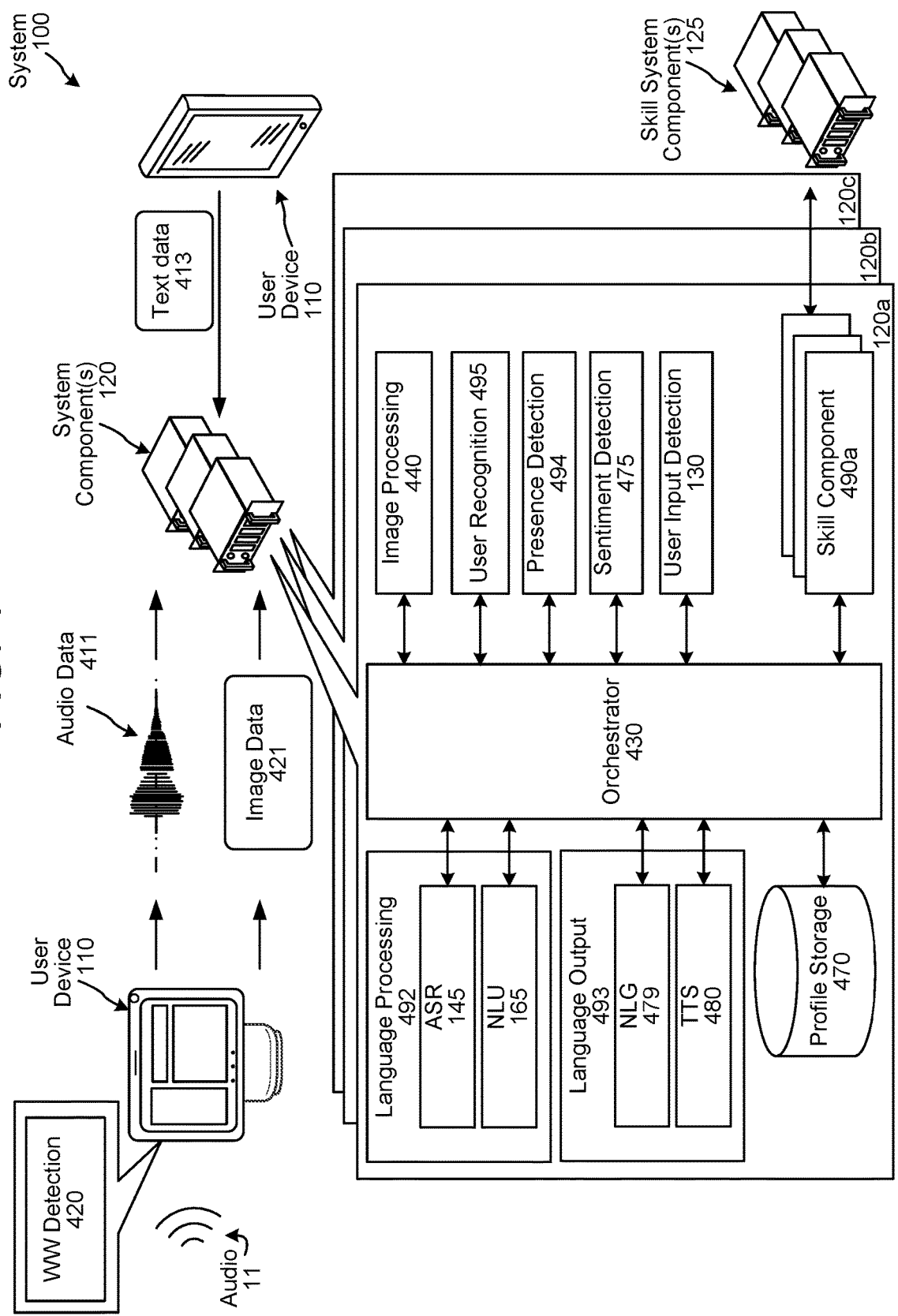
FIG. 4 is a conceptual diagram of components of a system, according to embodiments of the present disclosure.

In some embodiments, the verification component 150 may also receive data from a wakeword detection component 420 illustrated in and described with respect to FIG. 4. For example, an indication that a wakeword was detected in the speech may be considered by the user input detection component 130 (e.g., by the VAD component 135, the verification component 150, etc.) as part of determining whether the speech is system-directed. Detection of a wakeword may be considered a strong signal of system-directedness.

The verification component 150 may, therefore, process received data to generate activity data 152 representing an ultimate determination of the user input detection component 130 as to whether the speech is system- or user-directed.

The verification component 150 may send the activity data 152 to the task relevance component 155, either directly or indirectly via one or more other components of the system 100. The task relevance component 155 may further receive usage data 153 including one or more previous user inputs and/or system-generated responses. In some embodiments, the usage data 153 may be specific to a current dialog being detected by the user device 110. In some embodiments, the usage data 153 may include ASR output data and/or NLU output data associated with the one or more previous user inputs. In situations where the activity data 152 indicates the speech is user-directed, the task relevance component 155 may process the activity data 152 (and optionally one or more of the voice activity data 137, the vision activity data 142, the ASR output data 147, the usage data 153 and/or other contextual data) to determine whether the speech is relevant (i.e., speech that can be used by the system 100 to perform an action) or irrelevant (i.e., speech that cannot be used by the system 100 to perform an action).

As such, the task relevance component 155 may determine whether the system 100 should perform further processing with respect to user-directed speech.

In some embodiments, the task relevance component 155 may first process received data without consideration of the usage data 153. For example, the task relevance component 155 may be configured to process the ASR output data 147 to determine whether the speech includes sensitive information (e.g., personally identifiable information, confidential information (e.g., financial or medical information), offensive information (e.g., profanity), etc.). If the task relevance component 155 determines that the speech does not include sensitive information, this may indicate the speech is "relevant" user-directed speech.

The task relevance component 155 may further process the ASR output data 147 along with the usage data 153 to determine whether the user-directed speech is relevant. For example, the task relevance component 155 may determine whether the ASR output data 147 corresponds to one or more previous user inputs and/or system-generated responses of the usage data 153. If the task relevance component 155 determines the ASR output data 147 corresponds to one or more previous user inputs and/or system-generated responses of the usage data 153, this may indicate the speech is "relevant" user-directed speech.

In some embodiments, the task relevance component 155 may determine the speech is relevant user-directed speech based on comparing the ASR output data 147 with one or more portions of the usage data 153. For example, the task relevance component 155 may determine the speech is relevant user-directed speech based on the ASR output data 147 being "I'll take the chicken Caesar salad, please" and a previous input of the dialog being "What does everyone want from <Restaurant Name>." In other embodiments, the task relevance component 155 may determine the speech is relevant user-directed speech based on determining the ASR output data 147 corresponds to an action performable by the system 100. In some embodiments, the task relevance component 155 may compare the ASR output data 147 to one or more actions that are known to be performable by the system 100. For example, the task relevance component 155 may compare the ASR output data 147 to one or more text (or tokenized) representations of speech corresponding to actions performable by the system 100, one or more entity types supported by one or more skill components 490 of the system 100, etc. For example, in one embodiment, the task relevance component 155 may determine a semantic similarity between the ASR output data 147 and the one or more actions. Based on the semantic similarity, the task relevance component 155 may determine whether the speech corresponds to an action performable by the system 100. For example, based on the semantic similarity, the task relevance component 155 may determine that the speech includes an entity corresponding to one or more of the entity types supported by one or more skill components 490 of the system 100. In some embodiments, the task relevance component 155 may make such a determination using one or more models.

The model(s) of the task relevance component 155 may be trained on many different examples of inputs (e.g., the ASR output data 147) that include both positive and negative training samples (e.g., samples that both represent relevant user-directed input and irrelevant user-directed input) so that the model(s) of the task relevance component 155 may be capable of robustly detecting when input corresponds to a relevant user-directed input or not.

If the activity data 152 indicates that the speech is system-directed, the task relevance component 155 may send the ASR output data 147 to the NLU component 165 with performing the relevance determination processing discussed above. If the activity data 152 indicates the speech is user-directed and the task relevance component 155 determines the user-directed speech is irrelevant, the system 100 may cease processing with respect to the speech. Conversely, if the activity data 152 indicates the speech is user-directed and the task relevance component 155 determines the user-directed speech is relevant, the task relevance component 155 may send the ASR output data 147 to a context storage 160, where the ASR output data 147 may be stored in association with a dialog identifier corresponding to the current dialog.

The context storage 160 may include one or more instances of ASR output data corresponding to one or more instances of speech determined to be relevant and user-directed. In some embodiments, the one or more instances of ASR output data may be stored in association with corresponding dialog identifiers. In some embodiments, the ASR output data may be stored in association with other contextual data (e.g., an identity of the speaking user of the corresponding speech).

When the NLU component 165 receives ASR output data 147 of system-directed speech, the NLU component 165 processes the ASR output data 147 to generate NLU output data 179 including at least an intent corresponding to the system-directed speech.

As shown in FIG. 1A, the NLU component 165 may include a context retrieval component 167 and a rewrite component 175. The context retrieval component 167 may receive the ASR output data 147, of the system-directed speech, and query the context storage 160 for and receive therefrom context data 162a-n corresponding to one or more instances of ASR output data associated with a dialog identifier associated with the ASR output data 147. The context retrieval component 167 may include a filtering component 170 configured to process the ASR output data 147 and the context data 162a-n to determine a semantic similarity between the ASR output data 147 and the context data 162a-n (e.g., by computing a cosine similarity between the ASR output data 147 and the context data 162a-n).

The context retrieval component 167 may send the ASR output data 147 and context data 172 (e.g., the one or more portions of the context data 162a-n determined to be contextually associated with (e.g., semantically similar to) the ASR output data 147) to the rewrite component 175.

In some embodiments, the filtering component 170 may determine that a portion of context data 162 is contextually associated with the ASR output data 147 based on the portion of context data 162 being spoken by a same user as the ASR output data 147. The ASR output data may be associated with a user identifier representing the user that spoke the speech represented by the ASR output data 147. The filtering component 170 may identify the context data 162 associated with the same user identifier, and include such context data 162 in the context data 172.

The rewrite component 175 may be configured to process the ASR output data 147 and the context data 172 to generate rewritten ASR output data 177 corresponding to the ASR output data 147 including one or more words of the context data 172. In other words, the rewrite component 175 may be configured to generate a rewritten version of the ASR output data 147 which includes one or more relevant portions of the context data 172. The rewrite component 175 may use the context data 172 to resolve anaphora (e.g., "it," "they," "her," and/or other ambiguous words relating to an entity explicitly referred to previously in a dialog) in the ASR output data 147. For example, if the ASR output data 147 includes "please order that for us" and the context data 172 includes "I'll take the Chicken Caesar salad" and "I'll have the bacon cheeseburger," then the rewritten ASR output data 177 generated by the rewrite component 175 may include "please order the chicken Caesar salad and the bacon cheeseburger for us."

In some situations, the rewrite component 175 may process the ASR output data 147 and the context data 172 to generate rewritten ASR output data 177 corresponding to at least a portion of the context data 172 updated to include one or more words of the ASR output data 147. In other words, the rewrite component 175 may be configured to generate a rewritten version of the context data 172 (e.g., ASR output data of user-directed speech) which includes one or more relevant portions of the ASR output data 147. For example, if the context data 172 includes "we should order food" and the ASR output data 147 includes "I'll take the Chicken Caesar salad," then the rewritten ASR output data 177 generated by the rewrite component 175 may include "order the chicken Caesar salad."

In some embodiments, the rewrite component 175 may implement an ML model(s). For example, the ML model(s) may be configured to take as input (e.g., a concatenation of) the ASR output data 147 and the context data 172 and generate the rewritten ASR output data 177 corresponding to the ASR output data 147 and the contextually relevant information from the context data 172 (e.g., one or more words of the context data 172). In some embodiments the rewritten ASR output data 177 may represent a text or tokenized summarization of the ASR output data 147 and the context data 172. In some embodiments, the ML model(s) may correspond to a Transformer (e.g., a Bidirectional Auto-Regressive Transformer (BART), a tiny-BART, etc.)

The NLU component 165 may process the rewritten ASR output data 177 to generate the NLU output data 179.

Processing by the NLU component 165 to generate the NLU output data 179 is discussed in detail herein below with respect to FIG. 4.

The system 100 may send the NLU output data 179 to a component configured to generate an output responsive to the system-directed speech (e.g., a skill component 490, described in detail herein below with respect to FIG. 4). Thereafter, the system 100 may output data corresponding to the responsive content. For example, the system 100 may generate the output data using a TTS component (e.g., the TTS component 480 illustrated in and described with respect to FIG. 4 below). That is, the system 100 may cause the TTS component to generate output audio data including synthesized speech corresponding to the responsive content. For further example, the system 100 may generate visual output data (e.g., output image and/or video data) corresponding to the responsive content. As another example, the system 100 may include a component configured to generate interactive content (e.g., a graphical user interface (GUI) button(s)) corresponding to the responsive content. For example, the system 100 may cause the presentation of a GUI including text corresponding to the responsive content.

In some situations, the system 100 may cause the responsive content to be presented as visual content (e.g., an image or video). In such situations, the system 100 may cause the generation of output visual data corresponding to the responsive content, and send the output visual data to the user device 110 with an instruction to display the visual data.

In some situations, the system 100 may cause the responsive content to be presented as audio as well as visual content. In such situations, the system 100 may cause the generation of output multimedia data including the aforementioned output audio data and the aforementioned output visual data, and may send the output multimedia data to the user device 110 with an instruction to present same.

In situations where the system 100 causes visual data to be output, the visual data may be generated using data stored in the context storage 160 (i.e., data representing user-directed speech). For example, the system 100 may generate the visual data to include an image(s) of an entity represented data stored in the context storage 160.

Figure 1B:
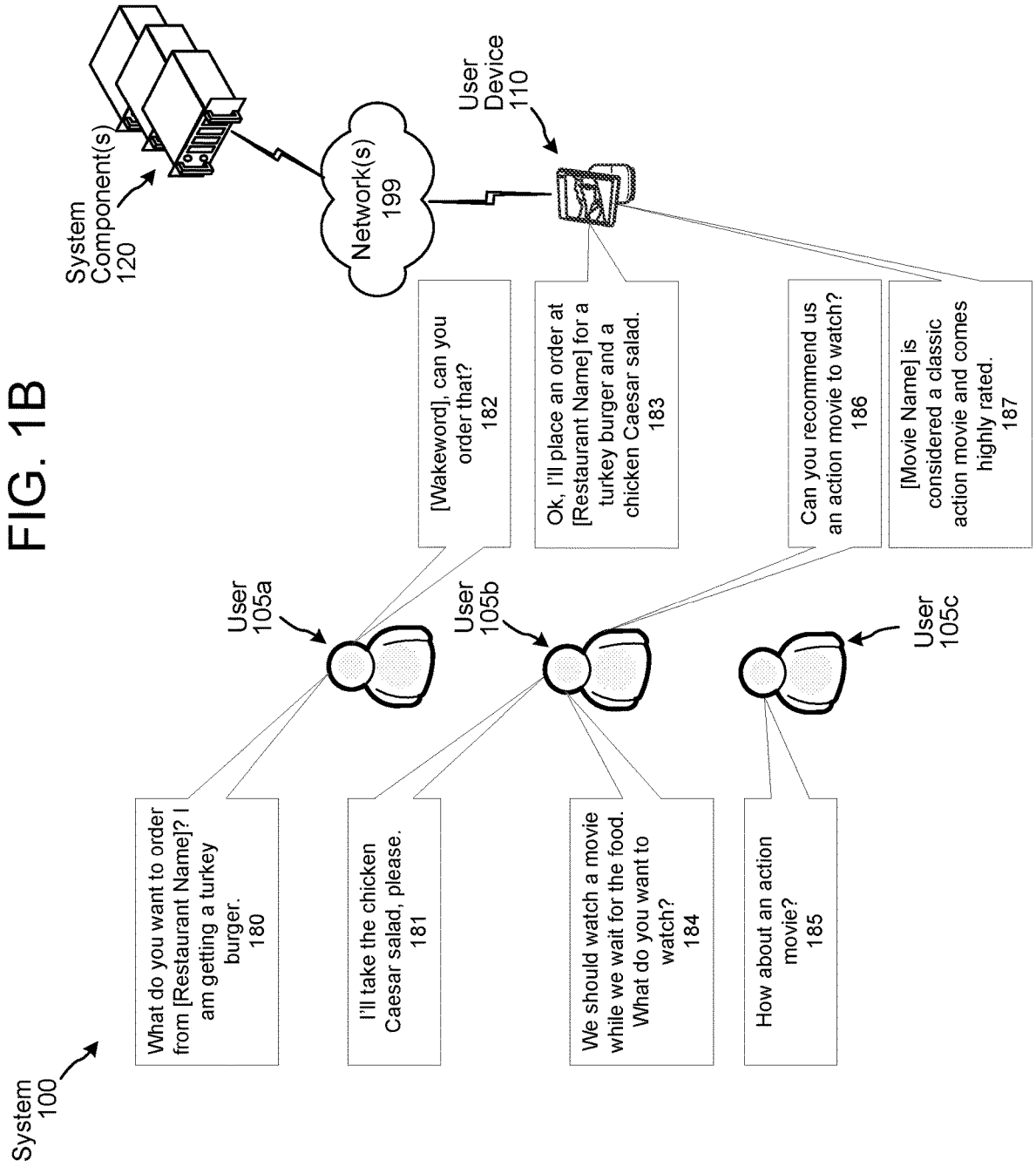
FIG. 1B is a conceptual diagram illustrating an example dialog between multiple users and a system, according to embodiments of the present disclosure.

FIG. 1B illustrates an example dialog between multiple users 105a, 105b, 105c and the system 100. As shown in FIG. 1B, during the dialog, a user 105a may provide first speech 180 of "What do you want to order from [Restaurant Name]? I am getting a turkey burger." This first speech 180 may be directed from the user 105a to the user 105b and/or the user 105c, and, therefore, may be an example of user-directed speech. As discussed above with respect to FIG. 1A, the system 100 may receive input data (e.g., audio data and/or video data) corresponding to the first speech 180, and process the input data to determine that the first speech 180 is user-directed instead of system-directed. The system 100 may further determine that the first speech 180 is relevant user-directed speech based on the first speech 180 corresponding to an action performable by the system (e.g., ordering food). The system 100 may therefore represent the first speech 180 in the context storage 160.

As further shown in FIG. 1B, the user 105b may provide second speech 181, responsive to the first speech of the user 105a, of "I'll take the chicken Caesar salad, please." This second speech 181 may be directed from the user 105b to the user 105a and, therefore, may be a further example of user-directed speech. As discussed above, the system 100 may process input data corresponding to the second speech 181 to determine the second speech 181 is user-directed instead of system-directed. The system 100 may further determine the second speech 181 is relevant user-directed speech based on the second speech 181 corresponding to an action performable by the system (e.g., ordering food) and optionally based on the previously received first speech 180. The system 100 may also determine the second speech 181 is relevant user-directed speech based on the second speech 181 being related to the previously received first speech 180. The system 100 may therefore represent the second speech 181 in the context storage 160.

The user 105a may provide third speech 182 of "[Wakeword], can you order that?" This third speech 182 may be directed from the user 105a to the user device 110 and, therefore, may be an example of system-directed speech. The system 100 may process input data corresponding to the third speech 182 to determine the third speech 182 is system-directed instead of user-directed. The system 100 may, therefore, retrieve one or more instances of speech previously determined to be relevant and user-directed from the context storage 160. The system 100 may determine the first speech 180 and the second speech 181 are contextually related to the third speech 182 (e.g., correspond to the action of ordering food) and may process the first speech 180, second speech 181, and third speech 182 as described herein above, with respect to FIG. 1A, to generate responsive output 183 content (e.g., audio and/or displayable content) of "Ok, I'll place an order at [Restaurant Name] for a turkey burger and a chicken Caesar salad."

Sometime thereafter, the user 105b may provide fourth speech 184 of "we should watch a movie while we wait for the food. What do you want to watch?" This fourth speech 184 may be directed from the user 105b to the user 105a and/or 105c and, therefore, may be a further example of user-directed speech. As discussed above, the system 100 may process input data corresponding to the fourth speech 184 to determine the fourth speech 184 is relevant and user-directed (e.g., directed to the user 105a and/or 105c and corresponding to watching a movie). The system 100 may therefore represent the fourth speech 184 in the context storage 160.

The user 105c may provide fifth speech 185 of "How about an action movie?" This fifth speech 185 may be directed from the user 105c to the user 105b and, therefore, may be a further example of user-directed speech. As discussed above, the system 100 may process input data corresponding to the fifth speech 185 to determine the fifth speech 185 is relevant and user-directed (e.g., directed to the user 105b and corresponding to watching a movie and/or related to the fourth speech) and may thus represent the fifth speech 185 in the context storage 160.

As shown in FIG. 1B, the user 105b may provide sixth speech 186 of "Can you recommend us an action movie to watch?" This sixth speech 186 may be directed from the user 105b to the user device 110 and, therefore, may be a further example of system-directed speech. As described herein, speech may not, with user authorization, be required to include a wakeword for the system 100 to process as described herein. With user authorization, the system 100 may process on speech regardless of whether the speech includes a wakeword. As discussed above, the system 100 may process input data corresponding to the sixth speech 186 to determine the sixth speech 186 is system-directed, instead of user-directed. The system 100 may process instances of previously received relevant user-directed speech to determine that the fourth speech 184 and the fifth speech 185 are contextually related to the sixth speech 186, and may process the fourth speech 184, the fifth speech 185, and the sixth speech 186, as described herein above with respect to FIG. 1A, to generate responsive output content 187 of "[Movie Name] is considered a classic action movie and comes highly rated."

One skilled in the art will appreciate that the example dialog illustrated in and described with respect to FIG. 1B is merely illustrative, and that dialogs of different durations and substance are within the scope of the present disclosure.

FIG. 2 illustrates example components of the ASR component 145 for determining when speech is spoken by more than one individual. As shown in FIG. 2, the user input detection component 130 may send the audio data 132 to the ASR component 145, and more particularly to a speaker change detection component 210 of the ASR component 145. The speaker change detection component 210 processes the audio data 132 to determine whether the audio data 132 includes speech spoken by more than one user. An example of speech being spoken by more than one user is "Chicken Caesar salad chicken fingers," where "chicken Caesar salad" is spoken by one user and "chicken fingers" is spoken by another user. Another example of speech being spoken by more than one user is "What kind of movie should we watch tonight action movie no actually a horror movie I was thinking we should watch a comedy," where "What kind of move should we watch tonight" and "I was thinking we should watch a comedy" is spoken by one user and "action movie" and "no actually a horror movie" is spoken by another user.

If the speaker change detection component 210 determines the audio data 132 includes speech spoken by more than one user, the speaker change detection component 210 generates speaker change data 215 indicating a portion(s) (e.g., in the form of a timestamp(s)) of the audio data 132 where the speaking user(s) of the speech changes.

In some embodiments, the speaker change detection component 210 may generate the speaker change data 215 by segmenting the audio data 132 into frames of audio data, where each frame covers a certain amount of time (e.g., 0.5 seconds), and compare adjacent frames to each other to determine whether the voice characteristics of the adjacent frames match.

Figure 3:
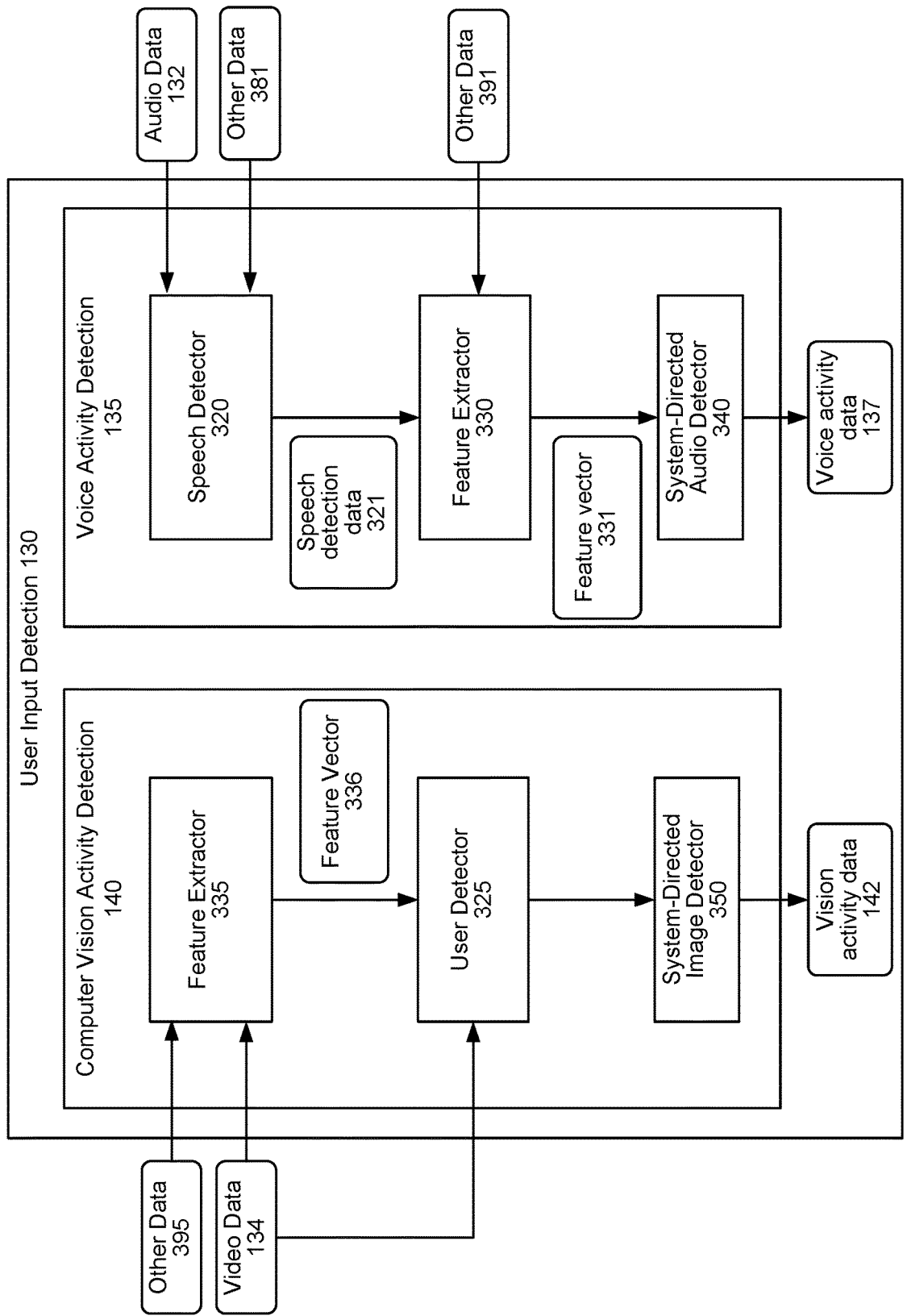
FIG. 3 is a conceptual diagram illustrating example components and processing of the voice activity detector component and the computer vision activity detector component illustrated in FIG. 1A, according to embodiments of the present disclosure.

In other embodiments, the speaker change detection component 210 may segment the audio data 132 based on the start-points and end-points of speech identified by a speech detector component 320 illustrated in and described with respect to FIG. 3. The speaker change detection component 210 may process a first frame of the audio data 132 and a second frame of the audio data 132 to generate feature vectors representing voice characteristics of the first frame and second frame, and compare the voice characteristics of the first frame and the second frame. If the voice characteristics of the first frame and the second frame match (e.g., have a similarity satisfying a condition, such as a threshold similarity), then the speaker change detection component 210 may determine that the first frame and the second frame of the correspond to a same speaking user. If the speaker change detection component 210 determines the voice characteristics of the first frame and the second frame do not match (e.g., have a similarity that does not satisfy a condition, such as a threshold similarity), then the speaker change detection component 210 may determine that the first frame and the second frame correspond to different speaking users.

While two examples of performing speaker change detection are described above, other speaker change detection techniques are within the scope of the present disclosure.

The speaker change detection component 210 may send the speaker change data 215 to the speaker assignment component 220.

The speaker assignment component 220 may further receive the audio data 132. The speaker assignment component 220 processes the speaker change data 215 and the audio data 132, and/or optionally other data, to generate speaker assignment data 225 that indicates an identity of a corresponding speaker for each portion of the speech segmented based on the speaker change data 215. For example, if the audio data corresponds to "Chicken Caesar salad chicken fingers" and the speaker change data 215 indicates a change in a speaking user occurs between "salad" and the following "chicken," the speaker assignment component 220 may generate the speaker assignment data 225 to represent "Chicken Caesar salad" was spoken by a first user, and "chicken fingers" was spoken by a second user. In some embodiments, a user identification in the speaker assignment data 225 may not be associated with a specific user identity (e.g., John D.), but may instead be a unique, anonymous identifier (e.g., user1) associated with the particular speaking user that is used to identify to the system 100 speech spoken by the same user. As such, the system 100 may use the unique identifier to identify speech (currently or previously) spoken by a particular user, without needing to generate metadata labelling the speech with the specific identity of the user (e.g., without needing to know the specific identity of the user, without the user needing to be registered with the system 100, etc.).

In some embodiments, a user recognition component 495/595 may process, as described in detail herein below with respect to FIG. 7, the audio data 132 in an effort to identify portions of the audio data 132 spoken by users known to the system 100. User recognition data 695, output by the user recognition component 495/595, may be provided to the speaker assignment component 220. To the extent that the user recognition data 695 indicates a specific user identifier (e.g., John) for a specific portion of the audio data 132, the speaker assignment component 220 may generate the speaker assignment data 225 to indicate the specific user identifier corresponds to the noted portion of the audio data 132.

Thus, it will be appreciated that the speaker assignment component 220 may generate the speaker assignment data 225 to include only specific user identifiers (e.g., Bob, Jane, etc.), only general user identifiers (e.g., user 1, user 2, etc.) in the case where any user recognition processing does not specifically identifier any speaking user, or a combination of specific and general user identifiers (e.g., bob, user 2, etc.).

The endpointing component 230 may process the audio data 132, and optionally the speaker change data 215, to generate endpoint data 235 indicating the beginning and end of speech included in the audio data 132. For example, if the audio data 132 corresponds to "Chicken Caesar salad Chicken fingers," then the endpoint data 235 may include a first timestamp indicating commencement of speaking of the first instance of "chicken" marks the beginning of first speech, a second timestamp indicating completion of speaking of "salad" marks the end of the first speech, a third timestamp indicating commencement of speaking of the second instance of "chicken" marks the beginning of second speech, a second timestamp indicating completion of speaking of "fingers" marks the end of the second speech.

The ASR component 145 may use the speaker change data 215, the speaker assignment data 225, and the endpoint data 235 to generate ASR output data 147. In some embodiments, the ASR output data 147 may include the speaker change data 215, the speaker assignment data 225, and/or the endpoint data 235. In the situation where the audio data 132 includes the speech of two or more users, the ASR output data 147 may correspond to multiple instances of ASR output data 147 (e.g., first ASR output data 147a, second ASR output data 147b, . . . , ASR output data 147n). Each instance of the ASR output data 147 may correspond to a different user's speech as detected, assigned, and endpointed by the speaker change detection component 210, the speaker assignment component 220, and the endpointing component 230.

In the situation where the ASR component 145 outputs multiple instances of the ASR output data 147, the verification component 150, task relevance component 155, and NLU component 165 may process, as described hereinabove with respect to FIG. 1A, with respect to each instance of the ASR output data 147.

In some embodiments, the rewritten ASR output data, in the context data 172, may be associated with corresponding speaker assignment data 225 as determined by the speaker assignment component 220. In such embodiments, the NLU component 165 and/or other components of the system 100 may use the speaker assignment data 225, corresponding to the portion of the context data 172 (e.g., ASR output data) used to rewrite the ASR output data 147, to generate a system output that is both responsive to the system-directed speech, and personalized to the speaking user of the system-directed speech. This may improve a user experience in a situation where multiple users are speaking with a detection area of the user device 110, and a particular user provides, at a first time, relevant user-directed speech and, at a second time, system-directed speech. Based on the speaker identity metadata associated with both the relevant user-directed speech and the system-directed speech, the system 100 can generate the output to be directed to the particular user, based on the particular user's previous user-directed speech being used in generation of the output data. For example, during a first time, the system 100 may receive speech that was directed from a first user to a second user of "I am in the mood for Action movies." The system 100 may identify this as relevant user-directed speech and may store ASR output data corresponding thereto in the context storage 160. During a second time, the system 100 may receive second speech directed from the first user to the system of "Any suggestions?" The system 100 may identify this as system-directed and may use the speaker identity metadata of the second speech to identify the stored, relevant user-directed speech as contextually associated with the second speech. The system 100 may then generate output data of "<First User>, based on your past viewing history and preference for action movies, how about <Movie Name>?")

In some embodiments, the system 100 may use speaker identity metadata to determine contextually associated user-directed speech. For example, if multiple users are discussing take-out orders, the system 100 may receive two instances of speech "I'll take the chicken Caesar salad" and "I'll take the bacon cheeseburger," which are spoken by a first and second user, respectively, and are stored in the context storage 160 based on both being determined to be relevant user-directed speech. Thereafter, the system 100 may receive additional speech from the first user of "can you order that, except with the dressing on the side for mine?" The system may determine that the additional speech is system-directed, and may use speaker identity metadata associated with the additional speech to identify the speech "I'll take the chicken Caesar salad" as contextually associated based on the speaker identity metadata for the speech and the additional speech representing both instances of speech were spoken by the first user. Therefore, the system 100 may use the speaker identity metadata to determine that the additional speech "can you order that, except with the dressing on the side for mine," refers to the speech "I'll take the chicken Caesar salad" instead of the speech "I'll take the bacon cheeseburger."

In some embodiments, the processing described above with respect to the user input detection component 130 may be performed regardless of whether the audio data 132 included a representation of a wakeword. For example, the system 100 may be configured to perform the processing described above with respect to the user input detection component 130 on any speech detected by the system 100 (e.g., detected by one or more microphones of or otherwise associated with the user device 110), regardless of whether the speech includes a representation of a wakeword. The system 100 may be configured as such in response to receiving an indication to operate regardless of detecting a wakeword by a user. For example, the user may provide an explicit input (e.g., audio input, text input, touch input, etc.) representing that the user requests that the system 100 operate regardless of detection of a wakeword. The system 100 may store an indication of the authorization in association with a device profile of the user device 110, a user profile of the user, etc.

Further components and processing of the ASR component 145 to generate the ASR output data 147 are discussed in detail herein below with respect to FIG. 4.

FIG. 3 illustrates example components and processing of the VAD component 135 and the CVAD component 140. As shown in FIG. 3, the VAD component 135 may include a speech detector component 320, a feature extractor component 330, and a system-directed audio detector component 340. The speech detector component 320 may determine whether the audio data 132 includes speech or not. The speech detection data 321 may be a binary indicator. Thus, if the audio data 132 includes speech, the speech detector component 320 may output speech detection data 321 including an indicator that the audio data 132 does include speech (e.g., a 1) and if the audio data 132 does not include speech, the speech detector component 320 may output speech detection data 321 including an indicator that the audio data 132 does not include speech (e.g., a 0). The speech detection data 321 may alternatively be a score (e.g., a number between 0 and 1) corresponding to a likelihood that the audio data 132 includes speech. The speech detector component 320 may also perform start-point detection as well as end-point detection where the speech detector component 320 determines when speech starts in the audio data 132 and when it ends in the audio data 132. Thus, the speech detection data 321 may also include indicators of a speech start point and/or a speech endpoint for use by other components of the system. For example, the start-point and end-points may demarcate the audio data 132 that is sent to the ASR component 145. The speech detection data 321 may be associated with a same unique identifier as the audio data 132 for purposes of tracking system processing across various components.

The speech detector component 320 may operate using a variety of VAD techniques. The speech detector component 320 may be configured to be robust to background noise so as to accurately detect when audio data actually includes speech or not. The speech detector component 320 may operate on raw audio data 132 such as that sent by user device 110 or may operate on feature vectors or other data representing the audio data 132. For example, the speech detector component 320 may take the form of a deep neural network (DNN) and may operate on a single feature vector representing the entirety of audio data 132 received from the user device 110 or may operate on multiple feature vectors, for example feature vectors representing frames of audio data where each frame covers a certain amount of time of audio data (e.g., 25 ms).

The speech detector component 320 may also operate on other data 381 that may be useful in detecting voice activity in the audio data 132. For example, the other data 381 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 132 to determine if that voice matches a voice in the reference section of speech. If the voices match, that may be an indicator to the speech detector component 320 that speech was detected. If not, that may be an indicator to the speech detector component 320 that speech was not detected.

The speech detector component 320 may also or alternatively consider other data when determining if speech was detected. The speech detector component 320 may also or alternatively consider user recognition data (such as may be output by user recognition component 495/595, as discussed herein below with respect to FIGS. 4 and 6-7), directionality data that may indicate what direction (relative to the capturing user device 110) the audio was received from. Such directionality data may be determined by a beamformer or other component of the user device 110. The speech detector component 320 may also consider data regarding a previous utterance which may indicate whether the audio data 132 is likely to include speech. Other VAD techniques may also be used.

If the speech detection data 321 indicates that no speech was detected the system 100 may discontinue processing with regard to the audio data 132, thus saving computing resources that might otherwise have been spent on other processes (e.g., ASR for the audio data 132, etc.). If the speech detection data 321 indicates that speech was detected, the system may send the audio data 132 to the ASR component 145, which may process as described herein above to generate the ASR output data 147. Additionally, if the speech detection data 321 indicates that speech was detected, the system may make a determination as to whether the speech was system-directed or not. Such a determination may be made by the system-directed audio detector component 340.

The system-directed audio detector component 340 may include a trained model, such as a DNN, that operates on a feature vector which represents certain data that may be useful in determining whether or not speech is system-directed. To create the feature vector, a feature extractor component 330 may be used. The feature extractor component 330 may generate a feature vector 331 including representations of the audio data 132 and optionally various other data 391. The other data 391 may include, for example, an indicator of a speaking user as output by the user recognition component 495, as discussed herein below with respect to FIGS. 4 and 6-7. Thus, for example, if the user recognition component 495 does not indicate the presence of a known user, or indicates the presence of a user associated with audio data 132 that was not associated with a previous utterance, this may indicate that the audio data 132 does not include system-directed speech. The other data 391 may also or alternatively include an indication that a voice represented in audio data 132 is the same or different as the voice detected in previous audio data corresponding to a previous utterance. The other data 391 may also or alternatively include directionality data, for example using beamforming or other audio processing techniques to determine a direction and/or location of a source of detected speech and whether that source direction and/or location matches a speaking user. The other data 391 may also or alternatively include data indicating that a direction of a user's speech is toward the user device 110 or away from the user device 110, which may indicate whether the speech was system-directed or not.

The other data 391 may also or alternatively include the video data 134. For example, the video data 134 may be processed to determine whether a user is facing the user device 110 for purposes of determining whether speech is system-directed as further explained below.

The other data 391 may also or alternatively include usage history data. For example, the other data 391 may include information about whether a speaking user has changed from a previous utterance to the current audio data 132, whether a topic of conversation has changed from a previous utterance to the current audio data, other system context information, etc. The other data 391 may also or alternatively include an indicator as to whether the audio data 132 was received as a result of a wake command or whether the audio data 132 was sent without the user device 110 detecting a wake command (e.g., the user device 110 being instructed by remote system component(s) and/or determining to send the audio data without first detecting a wake command).

The other data 391 may also or alternatively include information from the profile storage 470.

The other data 391 may also or alternatively include direction data, for example data regarding a direction of arrival of speech detected by the user device 110, for example a beam index number, angle data, or the like. If second audio data is received from a different direction than first audio data, then the system 100 may be less likely to declare the second audio data to include system-directed speech since it is originating from a different location.

The other data 391 may also or alternatively include acoustic feature data such as pitch, prosody, intonation, volume, and/or other data descriptive of the speech in the audio data 132. As a user may use a different vocal tone to speak with a computing device than with another human, acoustic feature information may be useful in determining if speech is system-directed.

The other data 391 may also or alternatively include an indicator representing whether the audio data 132 includes a wakeword. The indicator may o be incorporated in the feature vector 331 and/or otherwise considered by the system-directed audio detector component 340.

The other data 391 may also or alternatively include device history data such as information about previous operations related to the user device 110. For example, the other data 391 may include information about a previous utterance that was just responded to, where the utterance originated with the same user device 110 as a current utterance and the previous utterance was within a certain time window of the current utterance. Device history data may be stored in a manner associated with the device identifier (which may also be included in other data 391) of the user device 110, which may also be used to track other information about the user device 110, such as device hardware, capability, location, etc.

The other data 381 used by the speech detector component 320 may input similar data and/or different data from the other data 391 used by the feature extractor component 330. The other data 381/391 may thus include a variety of data corresponding to input audio from a previous utterance. That data may include acoustic data from a previous utterance, speaker identification data from a previous utterance, information about the time between a previous utterance and a current utterance, and/or a variety of other data described herein taken from a previous utterance. A score threshold, for the system-directed audio detector component 340 and/or the speech detector component 320, may be based on the data from the previous utterance. For example, a score threshold may be based on acoustic data from a previous utterance.

The system-directed audio detector component 340 may implement a trained model(s) (e.g., a DNN) on the feature vector 331 to determine a score corresponding to a likelihood that the audio data 132 includes a representation of system-directed speech. If the score satisfies a condition (e.g., satisfies a threshold score), the system-directed audio detector component 340 may determine that the audio data 132 does include a representation of system-directed speech. The voice activity data 137 may include an indicator of whether the audio data 132 includes system-directed speech, a score, and/or some other data (e.g., features included in the feature vector 331).

The voice activity data 137 may be associated with a same unique identifier as the audio data 132 and the speech detection data 321 for purposes of tracking system processing across various components.

The feature extractor component 330 may output a single feature vector 331 for one instance of audio data 132. The feature vector 331 may consistently be a fixed length, or may be a variable length vector depending on the relevant data available for particular audio data 132. Thus, the system-directed audio detector component 340 may output a single instance of voice activity data 137 per instance of audio data 132. As discussed above, the voice activity data 137 may be a binary indicator. Thus, if the audio data 132 includes system-directed speech, the system-directed audio detector component 340 may output the voice activity data 137 to indicate the audio data 132 does include system-directed speech (e.g., a 1) and if the audio data 132 does not include system-directed speech, the system-directed audio detector component 340 may output the voice activity data 137 to indicate the audio data 132 does not include system-directed speech (e.g., a 0). The voice activity data 137 may alternatively be a score (e.g., a number between 0 and 1) corresponding to a likelihood that the audio data 132 includes system-directed speech. Although not illustrated in FIG. 3, the flow of data to and from the user input detection component 130 may be managed by the orchestrator component 430 or by one or more other components, in some embodiments.

The trained model(s) of the system-directed audio detector component 340 may be trained on many different examples of feature vectors that include both positive and negative training samples (e.g., samples that both represent system-directed speech and non-system-directed speech) so that the trained model(s) of the system-directed audio detector component 340 may be capable of robustly detecting when speech is system-directed versus when speech is not system-directed.

A further input to the VAD component 135 may include output data from a TTS component 480 to avoid synthesized speech output by the system 100 being confused as system-directed speech spoken by a user. The output from the TTS component 480 may allow the system 100 to ignore synthesized speech in its considerations of whether speech was system-directed. The output from the TTS component 480 may also allow the system 100 to determine whether a captured utterance is responsive to the TTS output, thus improving system operations.

The VAD component 135 may also use echo return loss enhancement (ERLE) and/or acoustic echo cancellation (AEC) data to avoid processing of audio data generated by the system 100.

In some embodiments, the user input detection component 130 may simply use audio data to determine whether speech is system-directed. This may be true particularly when no video data (e.g., the video data 134) is available. If video data 134 is available, however, the user input detection component 130 may also be configured to use the video data 134 to determine if the content of the video data 134 is system-directed.

The video data 134 along with other data 395 may be received by the feature extractor 335. The feature extractor 335 may create one or more feature vectors 336 representing the video data 134 and optionally the other data 395. In certain situations, the other data 395 may include data from an image processing component 540 which may include information about faces, gesture, etc. detected in the video data 134. In some situations, the other data 395 may further include one or more instances of information included in the other data 381/391. For privacy protection purposes, in certain configurations any image processing and results thereof may be obtained from an image processing component 540 located on the user device 110 or on a home remote component as opposed to a image processing component 440 located on a cloud or other remote system component(s) 120 so that video data 134 is not sent remote from the user's home unless the user input detection component 130 has determined that the speech is system-directed. Though this may be adjusted depending on user preferences and/or system configuration to comply with local laws, rules, and regulations.

The feature vector 336 may be passed to the user detector 325. The user detector 325, which may use various components of an image processing component 540, the user recognition component 495, etc., may be configured to process the video data 134 and/or feature vector(s) 336 to determine information about the user's behavior which in turn may be used to determine if the content of the video data 134 is system-directed. For example, the user detector 325 may determine the user's position and/or behavior with respect to user device 110. The user detector 325 may also or alternatively determine whether a user's mouth is opening and closing in a manner that suggests the user is speaking. The user detector 325 may also or alternatively determine whether a user is nodding or shaking its head. The user detector 325 may also or alternatively determine whether a user's gaze is directed to the user device 110, to another user, or to another object. For example, the user detector 325 may include, or be configured to use data from, a gaze detector. The user detector 325 may also or alternatively determine gestures of the user such as a shoulder shrug, pointing toward an object, a wave, a hand up to indicate an instruction to stop, a finger moving to indicate an instruction to continue, holding up a certain number of fingers, putting a thumb up, etc. The user detector 325 may also or alternatively determine a user's position and/or orientation such as facing another user, facing the user device 110, whether the user's back is turned to the user device 110, etc. The user detector 325 may also or alternatively determine relative positions of multiple users that appear in the video data 134 and/or are speaking in audio data 132 which may also be considered by the user detector 325 along with feature vector 331, for example which users are closer to a user device 110 and which are farther away. The user detector 325 may also or alternatively identify other objects represented in the video data 134 and determine whether objects are relevant to a dialog or system interaction (e.g., determining if a user is referring to an object through a movement or speech).

The user detector 325 may operate one or more models (e.g., one or more classifiers) to determine if certain situations are represented in the video data 134. For example, the user detector 325 may employ a visual directedness classifier that may determine, for each face detected in the video data 134, whether that face is looking at the user device 110 or not. For example, a light-weight convolutional neural network (CNN) may be used which takes a face image cropped from the result of the face detector as input and output a [0,1] score of how likely the face is directed to the camera or not. Another technique may include determining a three-dimensional (3D) landmark of each face, estimating the 3D angle of the face, and predicting a directness score based on the 3D angle.

The user detector 325, or other component(s) such as the image processing component 540, may be configured to track a face in image data to determine which faces represented may belong to a same person. The system may use and Intersection-Over-Union(IOU)-based tracker, a meanshift-based tracker, a particle filter-based tracker, and/or other technique(s).

The user detector 325, or other component(s) such as the user recognition component 495/595) may determine whether a face represented in the video data 134 belongs to a person who is speaking or not, thus performing active speaker detection. The system may take the output from the face tracker and aggregate a sequence of faces from the same person as input and predict whether this person is speaking or not. Lip motion, user identification, detected voice data, and/or other data may be used to determine whether a user is speaking or not.

The system-directed image detector 350 may then determine, based on information from the user detector 325, whether content of the video data 134 is system-directed. The system-directed image detector 350 may also operate on other data, for example raw video data, the feature vector 336, the other data 381, the other data 391, and/or the other data 395. The determination by the system-directed image detector 350 may result in a score indicating whether the video data 134 includes system-directed content.

In some embodiments, the user input detection component 130 may further include a component configured to output an indication of system-directedness based on the outputs of both the VAD component 135 and the CVAD component 140. For example, the component may be configured to weigh the outputs of the VAD component 135 and the CVAD component 140 individually (e.g., based on other information available to the user input detection component 130) to determine to what extent audio and/or video data should impact the decision of whether speech in the audio data 132 is system-directed. These weighted data may then be sent to the verification component 150 for further processing.

The system 100 may operate using various components as described in FIG. 4. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of user device 110. Other input forms may include indication that the user has pressed a physical or virtual button on user device 110, the user has made a gesture, etc. The user device 110 may also capture images using camera(s) 818 of the user device 110 and may send image data 421 representing those image(s) to the system component(s) 120. The image data 421 may include raw image data or image data processed by the user device 110 before sending to the system component(s) 120. The image data 421 may be used in various manners by different components of the system to perform operations such as determining whether a user is directing an utterance to the system, interpreting a user command, responding to a user command, etc.

The wakeword detection component 420 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confu¬sion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420 and/or input is detected by an input detector, the user device 110 may "wake" and begin transmitting audio data 411, representing the audio 11, to the system component(s) 120. The audio data 411 may include data corresponding to the wakeword; in other embodiments, the portion of the audio corresponding to the wakeword is removed by the user device 110 prior to sending the audio data 411 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 490 of one or more system component(s) 120.

Upon receipt by the system component(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 492. The language processing component 492 (sometimes also referred to as a spoken language understanding (SLU) component) includes an automatic speech recognition (ASR) component 145 and a natural language understanding (NLU) component 165. The ASR component 145 may transcribe the audio data 411 into text data (e.g., included in the ASR output data). The ASR output data generated by the ASR component 145 represents one or more than one (e.g., in the form of an N-best list) ASR hypotheses representing speech represented in the audio data 411. The ASR component 145 interprets the speech in the audio data 411 based on a similarity between the audio data 411 and pre-established language models. For example, the ASR component 145 may compare the audio data 411 with models for sounds (e.g., acoustic units such as phonemes, senons, phones, etc.) and sequences of sounds to identify words that match the sequence of sounds of the speech represented in the audio data 411. The ASR component 145 sends the text data generated thereby to an NLU component 165, via, in some embodiments, the orchestrator component 430. The text data sent from the ASR component 145 to the NLU component 165 may include a single top-scoring ASR hypothesis or may include an N-best list including multiple top-scoring ASR hypotheses. An N-best list may additionally include a respective score associated with each ASR hypothesis represented therein.

In some embodiments, the ASR output data 147 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR output data 147 may include a trellis, which may include a raw search graph as scored during ASR decoding. The ASR output data 147 may also include a lattice, which may be a trellis as scored that has been pruned to remove certain hypotheses that do not exceed a score threshold or number of hypotheses threshold. The ASR output data 147 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR output data 147 may also include corresponding respective scores (such as for a trellis, lattice, confusion network, individual hypothesis, N-best list, etc.)

The ASR output data 147 may include other ASR output related data such as other features from the ASR component 145 or data determined by another component. For example, the system 100 may determine an entropy of the ASR output data 147 (for example a trellis entropy or the like) that indicates how spread apart the probability mass of the trellis is among the alternate hypotheses. A large entropy (e.g., large spread of probability mass over many hypotheses) may indicate the ASR component 145 being less confident about its best hypothesis, which in turn may correlate to detected speech not being system-directed. In some embodiments, the entropy may be a feature included in other data input to the verification component 150.

The system 100 may also determine and consider ASR decoding costs, which may include features from Viterbi decoding costs of the ASR output data 147. Such features may indicate how well the input acoustics and vocabulary match with acoustic models and language models of the ASR component 145. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 145 is less confident about the top hypothesis, which may correlate to detected speech not being device directed. Other such features or data from the ASR output data 147 may also be used as other data input to the verification component 150.

The language processing system 492 may further include a NLU component 165. The NLU component 165 may receive the text data from the ASR component. The NLU component 165 may attempts to make a semantic interpretation of the phrase(s) or statement(s) represented in the text data input therein by determining one or more meanings associated with the phrase(s) or statement(s) represented in the text data. The NLU component 165 may determine an intent representing an action that a user desires be performed and may determine information that allows a device (e.g., the user device 110, the system component(s) 120, a skill component 490, a skill system component(s) 125, etc.) to execute the intent. For example, if the text data corresponds to "play the 5th Symphony by Beethoven," the NLU component 165 may determine an intent that the system output music and may identify "Beethoven" as an artist/composer and "5th Symphony" as the piece of music to be played. For further example, if the text data corresponds to "what is the weather," the NLU component 165 may determine an intent that the system output weather information associated with a geographic location of the user device 110. In another example, if the text data corresponds to "turn off the lights," the NLU component 165 may determine an intent that the system turn off lights associated with the user device 110 or the user 5. However, if the NLU component 165 is unable to resolve the entity—for example, because the entity is referred to by anaphora such as "this song" or "my next appointment"—the language processing system 492 can send a decode request to another language processing system 492 for information regarding the entity mention and/or other context related to the utterance. The language processing system 492 may augment, correct, or base results data upon the audio data 411 as well as any data received from the other language processing system 492.

The NLU component 165 may return NLU results data 785/725 (which may include tagged text data, indicators of intent, etc.) back to the orchestrator component 430. The orchestrator component 430 may forward the NLU results data to a skill component(s) 490. If the NLU results data includes a single NLU hypothesis, the NLU component 165 and the orchestrator component 430 may direct the NLU results data to the skill component(s) 490 associated with the NLU hypothesis. If the NLU results data 785/725 includes an N-best list of NLU hypotheses, the NLU component 165 and the orchestrator component 430 may direct the top scoring NLU hypothesis to a skill component(s) 490 associated with the top scoring NLU hypothesis. The system may also include a post-NLU ranker which may incorporate other information to rank potential interpretations determined by the NLU component 165. The local user device 110 may also include its own post-NLU ranker, which may operate similarly to the post-NLU ranker. The NLU component 165, post-NLU ranker and other components are described in greater detail below with regard to FIGS. 6 and 7.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the user device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system component(s) 125 may communicate with a skill component(s) 490 within the system component(s) 120 and/or directly with the orchestrator component 430 or with other components. A skill support system component(s) 125 may be configured to perform one or more actions. An ability to perform such action(s) may sometimes be referred to as a "skill." That is, a skill may enable a skill support system component(s) 125 to execute specific functionality in order to provide data or perform some other action requested by a user. For example, a weather service skill may enable a skill support system component(s) 125 to provide weather information to the system component(s) 120, a car service skill may enable a skill support system component(s) 125 to book a trip with respect to a taxi or ride sharing service, an order pizza skill may enable a skill support system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 490 dedicated to interacting with the skill support system component(s) 125. Unless expressly stated otherwise, reference to a skill, skill device, or skill component may include a skill component 490 operated by the system component(s) 120 and/or skill operated by the skill support system component(s) 125. Moreover, the functionality described herein as a skill or skill may be referred to using many different terms, such as an action, bot, app, or the like. The skill component 490 and or skill support system component(s) 125 may return output data to the orchestrator component 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component that manages and/or tracks a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component may associate a dialog session identifier with the dialog upon identifying that the user is engaging in a dialog with the user. The dialog manager component may track a user input and the corresponding system generated response to the user input as a turn. The dialog session identifier may correspond to multiple turns of user input and corresponding system generated response. The dialog manager component may transmit data identified by the dialog session identifier directly to the orchestrator component 430 or other component. Depending on system configuration the dialog manager component may determine the appropriate system generated response to give to a particular utterance or user input of a turn. Or creation of the system generated response may be managed by another component of the system (e.g., the language output component 493, NLG component 479, orchestrator component 430, etc.) while the dialog manager component selects the appropriate responses. Alternatively, another component of the system component(s) 120 may select responses using techniques discussed herein. The text of a system generated response may be sent to a TTS component 480 for creation of audio data corresponding to the response. The audio data may then be sent to a user device (e.g., user device 110) for ultimate output to the user. Alternatively (or in addition) a dialog response may be returned in text or some other form.

The dialog manager component may receive the ASR hypothesis/hypotheses (i.e., text data) and make a semantic interpretation of the phrase(s) or statement(s) represented therein. That is, the dialog manager component determines one or more meanings associated with the phrase(s) or statement(s) represented in the text data based on words represented in the text data. The dialog manager component determines a goal corresponding to an action that a user desires be performed as well as pieces of the text data that allow a device (e.g., the user device 110, the system component(s) 120, a skill component 490, a skill system component(s) 125, etc.) to execute the intent. If, for example, the text data corresponds to "what is the weather," the dialog manager component may determine that that the system component(s) 120 is to output weather information associated with a geographic location of the user device 110. In another example, if the text data corresponds to "turn off the lights," the dialog manager component may determine that the system component(s) 120 is to turn off lights associated with the device(s) 110 or the user(s) 5.

The dialog manager component may send the results data to one or more skill component(s) 490. If the results data includes a single hypothesis, the orchestrator component 430 may send the results data to the skill component(s) 490 associated with the hypothesis. If the results data includes an N-best list of hypotheses, the orchestrator component 430 may send the top scoring hypothesis to a skill component(s) 490 associated with the top scoring hypothesis.

The system component(s) 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data discussed below). Alternatively or in addition, the TTS component 480 may receive text data from a skill component 490 or other system component for output.

The NLG component 479 may include a trained model. The NLG component 479 generates text data from dialog data received by the dialog manager component such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 411 representing the commands to the system component(s) 120 for processing, after which the system component(s) 120 may return output data that can cause the user device 110 to engage its camera.

Upon receipt by the system component(s) 120, the image data 421 may be sent to an orchestrator component 430. The orchestrator component 430 may send the image data 421 to an image processing component 440. The image processing component 440 can perform computer vision functions such as object recognition, modeling, reconstruction, etc. For example, the image processing component 440 may detect a person, face, etc. (which may then be identified using user recognition component 495). The device may also include an image processing component 540 which operates similarly to image processing component 440.

In some implementations, the image processing component 440 can detect the presence of text in an image. In such implementations, the image processing component 440 can recognize the presence of text, convert the image data to text data, and send the resulting text data via the orchestrator component 430 to the language processing component 492 for processing by the NLU component 165.

Figure 6:
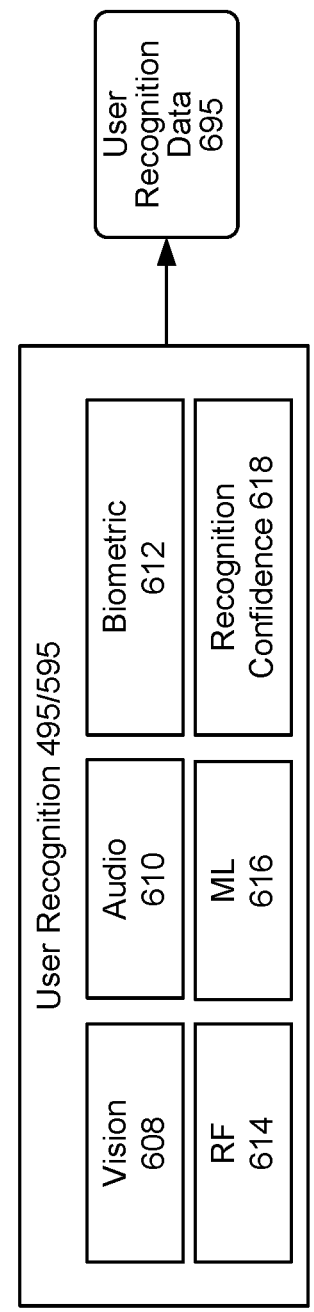
FIG. 6 is a schematic diagram of an illustrative architecture in which sensor data is combined to recognize one or more users according to embodiments of the present disclosure.

The system component(s) 120 may include a user recognition component 495 that recognizes one or more users using a variety of data, as described in greater detail below with regard to FIGS. 6-7. However, the disclosure is not limited thereto, and the user device 110 may include a user recognition component 595 instead of and/or in addition to user recognition component 495 of the system component(s) 120 without departing from the disclosure. User recognition component 595 operates similarly to user recognition component 495.

The user recognition component 495 may take as input the audio data 411 and/or text data output by the ASR component 145. The user recognition component 495 may perform user recognition by comparing audio characteristics in the audio data 411 to stored audio characteristics of users. The user recognition component 495 may also perform user recognition by comparing biometric data (e.g., fingerprint data, iris data, etc.), received by the system in correlation with the present user input, to stored biometric data of users assuming user permission and previous authorization. The user recognition component 495 may further perform user recognition by comparing image data (e.g., including a representation of at least a feature of a user), received by the system in correlation with the present user input, with stored image data including representations of features of different users. The user recognition component 495 may perform additional user recognition processes, including those known in the art.

The user recognition component 495 determines scores indicating whether user input originated from a particular user. For example, a first score may indicate a likelihood that the user input originated from a first user, a second score may indicate a likelihood that the user input originated from a second user, etc. The user recognition component 495 also determines an overall confidence regarding the accuracy of user recognition operations.

Output of the user recognition component 495 may include a single user identifier corresponding to the most likely user that originated the user input. Alternatively, output of the user recognition component 495 may include an N-best list of user identifiers with respective scores indicating likelihoods of respective users originating the user input. The output of the user recognition component 495 may be used to inform NLU processing as well as processing performed by other components of the system.

The system component(s) 120/user device 110 may include a presence detection component 494/594 that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 475 that may be configured to detect a sentiment of a user from audio data representing speech/utterances from the user, image data representing an image of the user, and/or the like. The sentiment detection component 475 may be included in system component(s) 120, as illustrated in FIG. 4, although the disclosure is not limited thereto and the sentiment detection component 475 may be included in other components without departing from the disclosure. For example the sentiment detection component 575 may be included in the user device 110, as a separate component, etc. Sentiment detection component 575 may operate similarly to sentiment detection component 475. The system component(s) 120 may use the sentiment detection component 475 to, for example, customize a response for a user based on an indication that the user is happy or frustrated.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 411 from the user device 110, to recognize speech corresponding to a spoken input in the received audio data 411, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 580) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 4, the user device 110 may include a wakeword detection component 420 configured to compare the audio data 411 to stored models used to detect a wakeword (e.g., "Alexa") that indicates to the user device 110 that the audio data 411 is to be processed for determining NLU output data (e.g., slot data that corresponds to a named entity, label data, and/or intent data, etc.). In at least some embodiments, a hybrid selector 524, of the user device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 120, and may prevent the ASR component 550 from further processing the audio data 411. In this situation, the audio data 411 can be discarded.

The user device 110 may conduct its own speech processing using on-device language processing components, such as an SLU/language processing component 592 (which may include an ASR component 550 and an NLU component 560), similar to the manner discussed herein with respect to the SLU component 492 (or ASR component 145 and the NLU component 165) of the system component(s) 120. Language processing component 592 may operate similarly to language processing component 492, ASR component 550 may operate similarly to ASR component 145 and NLU component 560 may operate similarly to NLU component 165. The user device 110 may also internally include, or otherwise have access to, other components such as one or more skill components 590 capable of executing commands based on NLU output data or other results determined by the user device 110/system component(s) 120 (which may operate similarly to skill components 490), a user recognition component 595 (configured to process in a similar manner to that discussed herein with respect to the user recognition component 495 of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the user device 110. Similar to as described above with respect to skill component 490, a skill component 590 may communicate with a skill system component(s) 125. The user device 110 may also have its own language output component 593 which may include NLG component 579 and TTS component 580. Language output component 593 may operate similarly to language output component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 524, of the user device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system component(s) 120 or the local language processing components. However, the disclosure is not limited thereto, and in some examples the hybrid selector 524 may send the audio data 411 only to the local ASR component 550 without departing from the disclosure. For example, the user device 110 may process the audio data 411 locally without sending the audio data 411 to the system component(s) 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 165 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 411 to the system component(s) 120, and the response data from the system component(s) 120 may include the unique identifier to identify which natural language user input the response data corresponds.

In at least some embodiments, the user device 110 may include, or be configured to use, one or more skill components 590 that may work similarly to the skill component(s) 490 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 590, a skill system component(s) 125, or a combination of a skill component 590 and a corresponding skill system component(s) 125.

Similar to the manner discussed with regard to FIG. 4, the local user device 110 may be configured to recognize multiple different wakewords and/or perform different categories of tasks depending on the wakeword. Such different wakewords may invoke different processing components of local user device 110 (not illustrated in FIG. 5). For example, detection of the wakeword "Alexa" by the wakeword detection component 420 may result in sending audio data to certain language processing components 592/skill components 590 for processing while detection of the wakeword "Computer" by the wakeword detector may result in sending audio data different language processing components 592/skill components 590 for processing.

The user device 110 and/or the system component(s) 120 may include a user recognition component 495 that recognizes one or more users using a variety of data. As illustrated in FIG. 6, the user recognition component 495 may include one or more subcomponents including a vision component 608, an audio component 610, a biometric component 612, a radio frequency (RF) component 614, a machine learning (ML) component 616, and a recognition confidence component 618. In some instances, the user recognition component 495 may monitor data and determinations from one or more subcomponents to determine an identity of one or more users associated with data input to the user device 110 and/or the system component(s) 120. The user recognition component 495 may output user recognition data 695, which may include a user identifier associated with a user the user recognition component 495 determines originated data input to the user device 110 and/or the system component(s) 120. The user recognition data 695 may be used to inform processes performed by various components of the user device 110 and/or the system component(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 495 may utilize determinations from additional components to determine an identity of a user. The vision component 608 can be used in conjunction with other components to determine an identity of a user. For example, the user recognition component 495 may use data from the vision component 608 with data from the audio component 610 to identify what user's face appears to be speaking at the same time audio is captured by a user device 110 the user is facing for purposes of identifying a user who spoke an input to the user device 110 and/or the system component(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The radio frequency (RF) component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the user device 110. In this manner, the user may "register" with the system 100 for purposes of the system 100 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the user device 110 and/or the system component(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of user device 110 and/or the system component(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 411 input into the user device 110 and/or the system component(s) 120 for speech processing. The audio component 610 may determine scores indicating whether speech in the audio data 411 originated from particular users. For example, a first score may indicate a likelihood that speech in the audio data 411 originated from a first user associated with a first user identifier, a second score may indicate a likelihood that speech in the audio data 411 originated from a second user associated with a second user identifier, etc. The audio component 610 may perform user recognition by comparing speech characteristics represented in the audio data 411 to stored speech characteristics of users (e.g., stored voice profiles associated with the user device 110 that captured the spoken user input).

Figure 7:
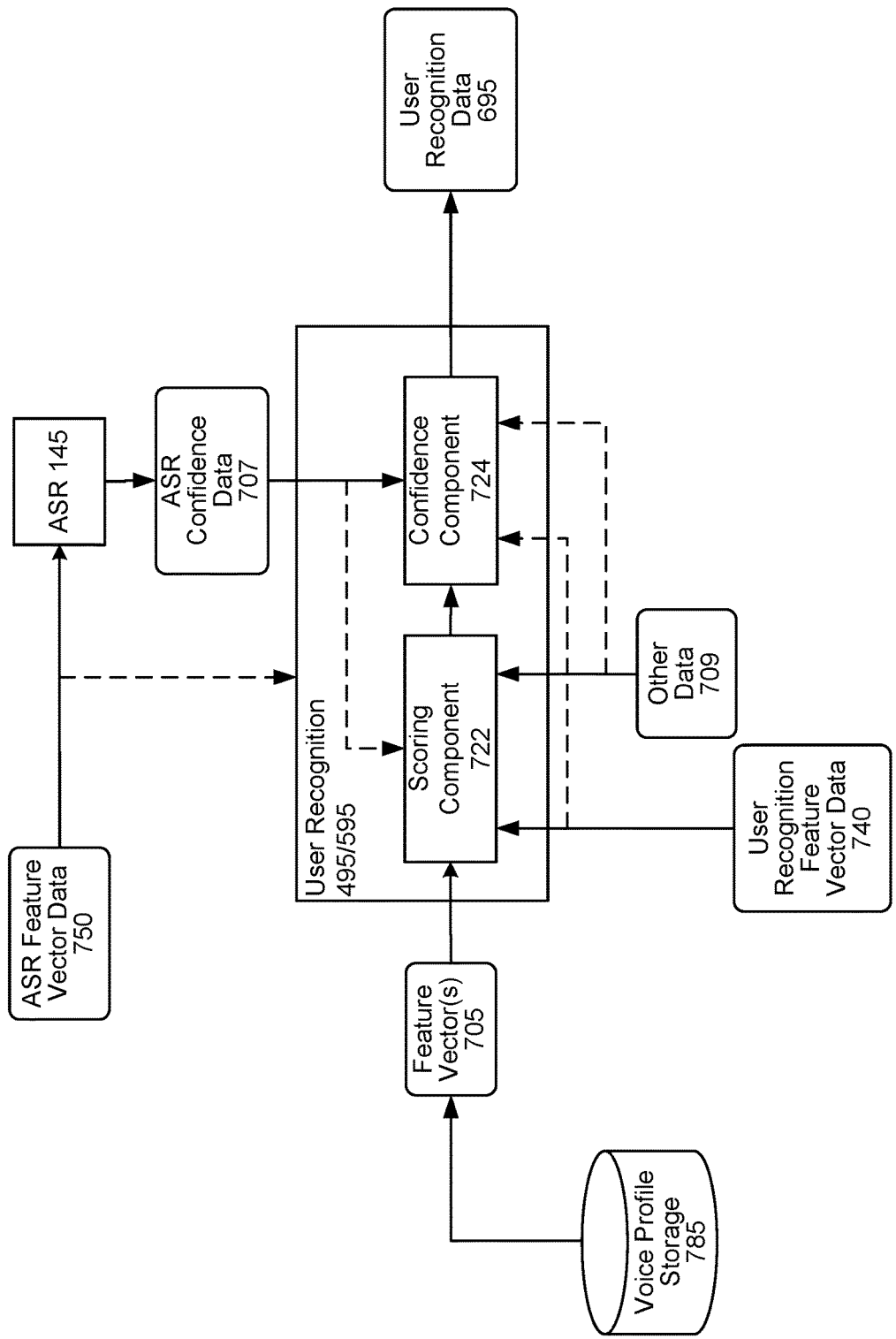
FIG. 7 is a system flow diagram illustrating user recognition according to embodiments of the present disclosure.

FIG. 7 illustrates user recognition processing as may be performed by the user recognition component 495. The ASR component 145 performs ASR processing on ASR feature vector data 750. ASR confidence data 707 may be passed to the user recognition component 495.

The user recognition component 495 performs user recognition using various data including the user recognition feature vector 740, feature vectors 705 representing voice profiles of users of the system 100, the ASR confidence data 707, and other data 709. The user recognition component 495 may output the user recognition data 695, which reflects a certain confidence that the user input was spoken by one or more particular users. The user recognition data 695 may include one or more user identifiers (e.g., corresponding to one or more voice profiles). Each user identifier in the user recognition data 695 may be associated with a respective confidence value, representing a likelihood that the user input corresponds to the user identifier. A confidence value may be a numeric or binned value.

The feature vector(s) 705 input to the user recognition component 495 may correspond to one or more voice profiles. The user recognition component 495 may use the feature vector(s) 705 to compare against the user recognition feature vector 740, representing the present user input, to determine whether the user recognition feature vector 740 corresponds to one or more of the feature vectors 705 of the voice profiles. Each feature vector 705 may be the same size as the user recognition feature vector 740.

To perform user recognition, the user recognition component 495 may determine the user device 110 from which the audio data 411 originated. For example, the audio data 411 may be associated with metadata including a device identifier representing the user device 110. Either the user device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 740 produced from the audio data 411. The user recognition component 495 may send a signal to voice profile storage 785, with the signal requesting only audio data and/or feature vectors 705 (depending on whether audio data and/or corresponding feature vectors are stored) associated with the device identifier, the group profile identifier, and/or the user identifiers represented in the metadata. This limits the universe of possible feature vectors 705 the user recognition component 495 considers at runtime and thus decreases the amount of time to perform user recognition processing by decreasing the amount of feature vectors 705 needed to be processed. Alternatively, the user recognition component 495 may access all (or some other subset of) the audio data and/or feature vectors 705 available to the user recognition component 495. However, accessing all audio data and/or feature vectors 705 will likely increase the amount of time needed to perform user recognition processing based on the magnitude of audio data and/or feature vectors 705 to be processed.

If the user recognition component 495 receives audio data from the voice profile storage 785, the user recognition component 495 may generate one or more feature vectors 705 corresponding to the received audio data.

The user recognition component 495 may attempt to identify the user that spoke the speech represented in the audio data 411 by comparing the user recognition feature vector 740 to the feature vector(s) 705. The user recognition component 495 may include a scoring component 722 that determines respective scores indicating whether the user input (represented by the user recognition feature vector 740) was spoken by one or more particular users (represented by the feature vector(s) 705). The user recognition component 495 may also include a confidence component 724 that determines an overall accuracy of user recognition processing (such as those of the scoring component 722) and/or an individual confidence value with respect to each user potentially identified by the scoring component 722. The output from the scoring component 722 may include a different confidence value for each received feature vector 705. For example, the output may include a first confidence value for a first feature vector 705*a* (representing a first voice profile), a second confidence value for a second feature vector 705*b* (representing a second voice profile), etc. Although illustrated as two separate components, the scoring component 722 and the confidence component 724 may be combined into a single component or may be separated into more than two components.

The scoring component 722 and the confidence component 724 may implement one or more trained machine learning models (such as neural networks, classifiers, etc.) as known in the art. For example, the scoring component 722 may use probabilistic linear discriminant analysis (PLDA) techniques. PLDA scoring determines how likely it is that the user recognition feature vector 740 corresponds to a particular feature vector 705. The PLDA scoring may generate a confidence value for each feature vector 705 considered and may output a list of confidence values associated with respective user identifiers. The scoring component 722 may also use other techniques, such as GMMs, generative Bayesian models, or the like, to determine confidence values.

The confidence component 724 may input various data including information about the ASR confidence data 707, speech length (e.g., number of frames or other measured length of the user input), audio condition/quality data (such as signal-to-interference data or other metric data), fingerprint data, image data, or other factors to consider how confident the user recognition component 495 is with regard to the confidence values linking users to the user input. The confidence component 724 may also consider the confidence values and associated identifiers output by the scoring component 722. For example, the confidence component 724 may determine that a lower ASR confidence data 707, or poor audio quality, or other factors, may result in a lower confidence of the user recognition component 495. Whereas a higher ASR confidence data 707, or better audio quality, or other factors, may result in a higher confidence of the user recognition component 495. Precise determination of the confidence may depend on configuration and training of the confidence component 724 and the model(s) implemented thereby. The confidence component 724 may operate using a number of different machine learning models/techniques such as GMM, neural networks, etc. For example, the confidence component 724 may be a classifier configured to map a score output by the scoring component 722 to a confidence value.

The user recognition component 495 may output user recognition data 695 specific to a one or more user identifiers. For example, the user recognition component 495 may output user recognition data 695 with respect to each received feature vector 705. The user recognition data 695 may include numeric confidence values (e.g., 0.0-1.0, 0-1000, or whatever scale the system is configured to operate). Thus, the user recognition data 695 may output an n-best list of potential users with numeric confidence values (e.g., user identifier 123—0.2, user identifier 234—0.8). Alternatively or in addition, the user recognition data 695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 495 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 695 may only include information related to the top scoring identifier as determined by the user recognition component 495. The user recognition component 495 may also output an overall confidence value that the individual confidence values are correct, where the overall confidence value indicates how confident the user recognition component 495 is in the output results. The confidence component 724 may determine the overall confidence value.

The confidence component 724 may determine differences between individual confidence values when determining the user recognition data 695. For example, if a difference between a first confidence value and a second confidence value is large, and the first confidence value is above a threshold confidence value, then the user recognition component 495 is able to recognize a first user (associated with the feature vector 705 associated with the first confidence value) as the user that spoke the user input with a higher confidence than if the difference between the confidence values were smaller.

The user recognition component 495 may perform thresholding to avoid incorrect user recognition data 695 being output. For example, the user recognition component 495 may compare a confidence value output by the confidence component 724 to a threshold confidence value. If the confidence value does not satisfy (e.g., does not meet or exceed) the threshold confidence value, the user recognition component 495 may not output user recognition data 695, or may only include in that data 695 an indicator that a user that spoke the user input could not be recognized. Further, the user recognition component 495 may not output user recognition data 695 until enough user recognition feature vector 740 is accumulated and processed to verify a user above a threshold confidence value. Thus, the user recognition component 495 may wait until a sufficient threshold quantity of audio data of the user input has been processed before outputting user recognition data 695. The quantity of received audio data may also be considered by the confidence component 724.

The user recognition component 495 may be defaulted to output binned (e.g., low, medium, high) user recognition confidence values. However, such may be problematic in certain situations. For example, if the user recognition component 495 computes a single binned confidence value for multiple feature vectors 705, the system may not be able to determine which particular user originated the user input. In this situation, the user recognition component 495 may override its default setting and output numeric confidence values. This enables the system to determine a user, associated with the highest numeric confidence value, originated the user input.

The user recognition component 495 may use other data 709 to inform user recognition processing. A trained model(s) or other component of the user recognition component 495 may be trained to take other data 709 as an input feature when performing user recognition processing. Other data 709 may include a variety of data types depending on system configuration and may be made available from other sensors, devices, or storage. The other data 709 may include a time of day at which the audio data 411 was generated by the user device 110 or received from the user device 110, a day of a week in which the audio data 411 was generated by the user device 110 or received from the user device 110, etc.

The other data 709 may include image data or video data. For example, facial recognition may be performed on image data or video data received from the user device 110 from which the audio data 411 was received (or another device). Facial recognition may be performed by the user recognition component 495. The output of facial recognition processing may be used by the user recognition component 495. That is, facial recognition output data may be used in conjunction with the comparison of the user recognition feature vector 740 and one or more feature vectors 705 to perform more accurate user recognition processing.

The other data 709 may include location data of the user device 110. The location data may be specific to a building within which the user device 110 is located. For example, if the user device 110 is located in user A's bedroom, such location may increase a user recognition confidence value associated with user A and/or decrease a user recognition confidence value associated with user B.

The other data 709 may include data indicating a type of the user device 110. Different types of devices may include, for example, a smart watch, a smart phone, a tablet, and a vehicle. The type of the user device 110 may be indicated in a profile associated with the user device 110. For example, if the user device 110 from which the audio data 411 was received is a smart watch or vehicle belonging to a user A, the fact that the user device 110 belongs to user A may increase a user recognition confidence value associated with user A and/or decrease a user recognition confidence value associated with user B.

The other data 709 may include geographic coordinate data associated with the user device 110. For example, a group profile associated with a vehicle may indicate multiple users (e.g., user A and user B). The vehicle may include a global positioning system (GPS) indicating latitude and longitude coordinates of the vehicle when the vehicle generated the audio data 411. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the user device 110 may indicate global coordinates and associated locations (e.g., work, home, etc.). One or more user profiles may also or alternatively indicate the global coordinates.

The other data 709 may include data representing activity of a particular user that may be useful in performing user recognition processing. For example, a user may have recently entered a code to disable a home security alarm. A user device 110, represented in a group profile associated with the home, may have generated the audio data 411. The other data 709 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the user device 110, this may be reflected in the other data 709 and considered by the user recognition component 495.

Depending on system configuration, the other data 709 may be configured to be included in the user recognition feature vector 740 so that all the data relating to the user input to be processed by the scoring component 722 may be included in a single feature vector. Alternatively, the other data 709 may be reflected in one or more different data structures to be processed by the scoring component 722.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
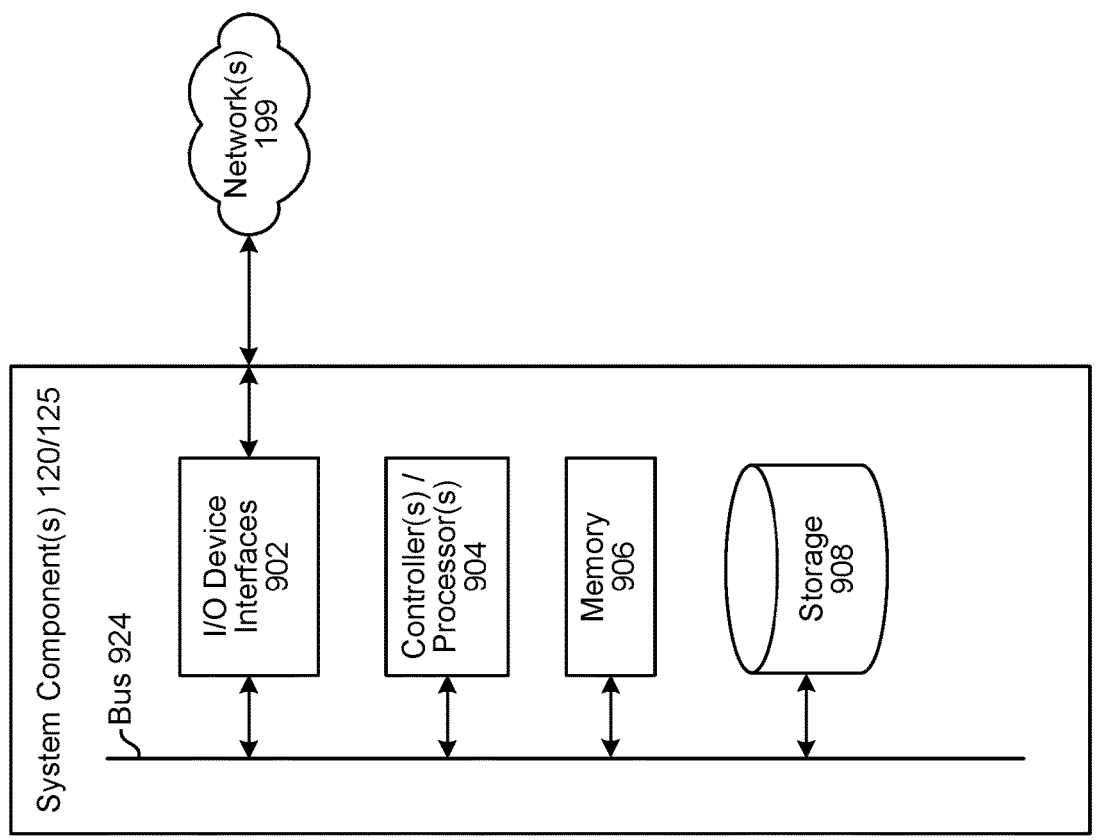
FIG. 9 is a block diagram conceptually illustrating example components of a system component, according to embodiments of the present disclosure.

FIG. 8 is a block diagram conceptually illustrating a user device 110 that may be used with the system. FIG. 9 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the user device 110 may include input/output device interfaces 802 that connect to a variety of components such as an audio output component such as a speaker 812, a wired headset or a wireless headset (not illustrated), or other component capable of outputting audio. The user device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 816 for displaying content. The user device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (802/902), processor(s) (804/904), memory (806/906), and/or storage (808/908) of the device(s) 110, natural language command processing system component(s) 120, or the skill system component(s) 125, respectively. Thus, the ASR component 145 may have its own I/O interface(s), processor(s), memory, and/or storage; the NLU component 165 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 492/592 (which may include ASR 145/550), language output 493/593 (which may include NLG component 479/579 and TTS 480/580), etc., for example as illustrated in FIGS. 4 and 5. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
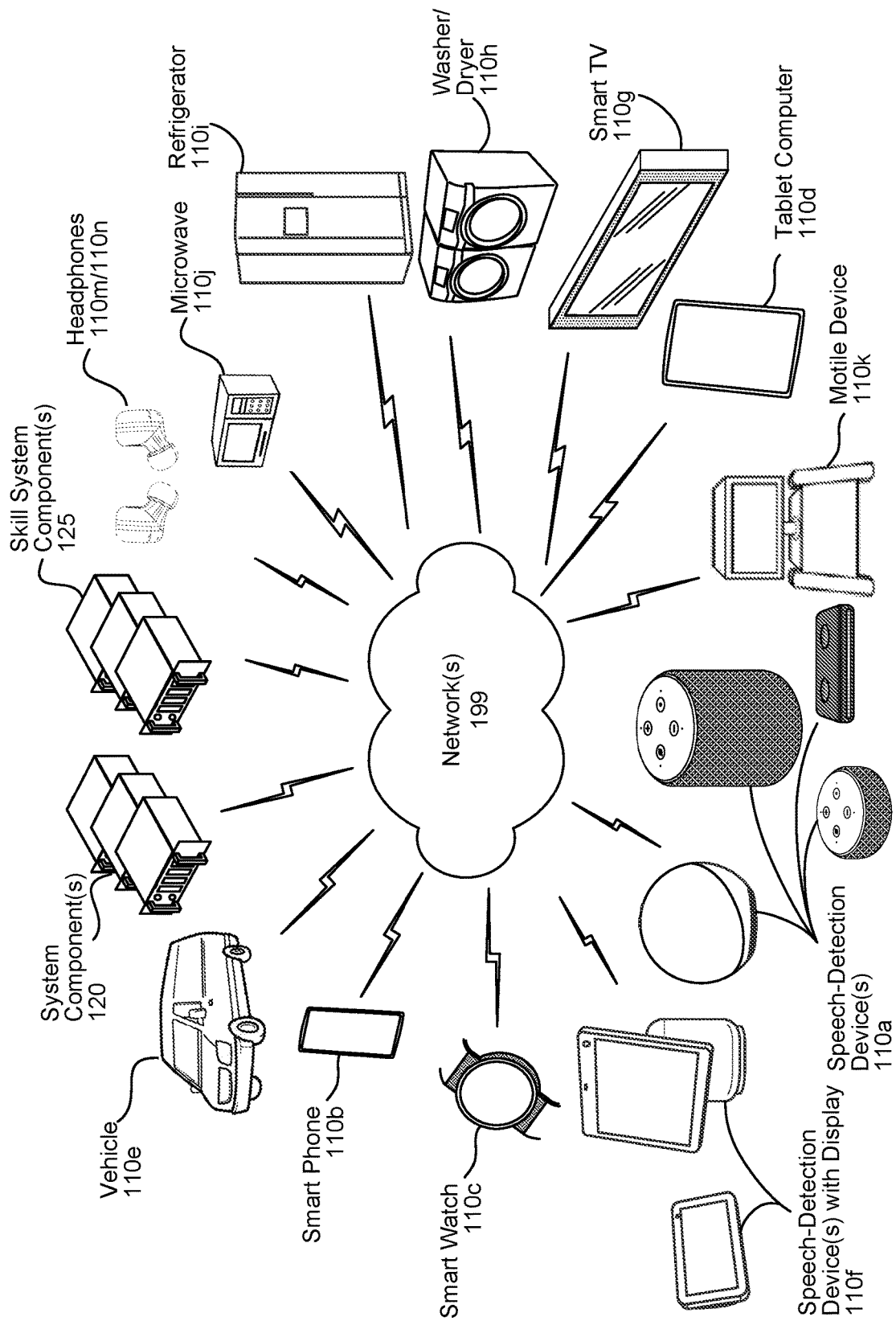
FIG. 10 illustrates an example of a computer network, according to embodiments of the present disclosure.

As illustrated in FIG. 10, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 145, the NLU component 165, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, first input audio data corresponding to first speech of a first user;
   performing automatic speech recognition (ASR) processing using the first input audio data to determine first ASR output data comprising a first transcript of the first speech;
   based on the first input audio data and the first ASR output data, determining the first speech is directed at a second user instead of the device;
   determining information included in the first speech is usable to respond to speech directed to the device;
   based on determining the information included in the first speech is usable to respond to the speech directed to the device, sending the first ASR output data to a storage;
   after sending the first ASR output data to the storage, receiving, from the device, second input audio data corresponding to second speech;
   performing ASR processing using the second input audio data to determine second ASR output data comprising a second transcript of the second speech;
   based on the second ASR output data, determining the second speech is directed to the device;
   based on determining the second speech is directed at the device, receiving the first ASR output data from the storage;
   after receiving the first ASR output data from the storage, determining rewritten ASR output data corresponding to the second ASR output data updated to include at least one word from the first ASR output data;
   performing natural language understanding (NLU) processing using the rewritten ASR output data to determine NLU output data comprising an intent corresponding to the second speech;
   based on the NLU output data, determining second output data responsive to the second speech; and
   causing presentation of the second output data.

2. The computer-implemented method of claim 1, further comprising:
   receiving first input image data corresponding to at least a first image representing the first user, wherein determining the first speech is directed at the second user instead of the device is further based on the first input image data; and
   receiving second input image data corresponding to at least a second image representing the first user, wherein determining the second speech is directed at the device is further based on the second input image data.

3. The computer-implemented method of claim 1, further comprising:
   based on determining the second speech is directed at the device, receiving, from the storage, third ASR output data comprising a third transcript of third speech, wherein the third speech was received prior to the first speech, and the third ASR output data was stored based on the third speech being directed at a third user instead of the device; and
   determining the second ASR output data is semantically similar to the first ASR output data instead of the third ASR output data, wherein the rewritten ASR output data includes the at least one word from the first ASR output data instead of the third ASR output data based on the second ASR output data being semantically similar to the first ASR output data instead of the third ASR output data.

4. The computer-implemented method of claim 1, further comprising:
   determining usage data including third ASR output data corresponding to third speech of a dialog;
   determining the first speech is semantically similar to the third speech; and
   sending the first ASR output data to the storage is further based on the first speech being semantically similar to the third speech.

5. A computer-implemented method comprising:
   receiving, from a device, first input audio data corresponding to first speech of a first user;
   determining the first speech is directed at the device;
   based on determining the first speech is directed at the device, receiving, from a storage, a transcript of second speech, wherein the second speech was received prior to the first speech, and the transcript was stored based on the second speech being directed at a second user instead of the device;
   after receiving the transcript from the storage, determining first natural language data corresponding to the first speech updated to include at least one word from the second speech;
   performing natural language understanding (NLU) processing using the first natural language data to determine NLU output data comprising a first intent corresponding to at least one of the first speech and the second speech;
   based on the NLU output data, determining first output data responsive to at least one of the first speech and the second speech; and
   causing presentation of the first output data.

6. The computer-implemented method of claim 5, further comprising:
   prior to receiving the first input audio data, receiving second input audio data corresponding to the second speech;
   determining the second speech is directed at the second user instead of the device;
   determining information included in the second speech is usable to respond to speech directed to the device; and
   based on determining the information included in the second speech is usable to respond to the speech directed to the device, sending the transcript of the second speech to the storage.

7. The computer-implemented method of claim 6, further comprising:
   determining an entity referenced in the second speech; and
   determining the entity corresponds to an entity type capable of being processed using NLU processing, wherein determining the information included in the second speech is usable to respond to the speech directed to the device is based on the entity corresponding to the entity type.

8. The computer-implemented method of claim 6, further comprising:
   determining usage data including a second transcript of third speech; and
   determining the second speech is semantically similar to the third speech, wherein sending the second speech to the storage is further based on the second speech being semantically similar to the third speech.

9. The computer-implemented method of claim 5, further comprising:
   receiving input image data corresponding to at least a first image representing the first user, wherein:
   determining the first speech is directed at the device is further based on the input image data.

10. The computer-implemented method of claim 5, further comprising:
    based on determining the first speech is directed at the device, receiving, from the storage, a second transcript of third speech, wherein the third speech was received prior to the first speech, and the second transcript was stored based on the third speech being directed at a third user instead of the device; and
    determining the first speech is semantically similar to the second speech, instead of the third speech, wherein the first natural language data includes the at least one word from the second speech, instead of the third speech based on the first speech being semantically similar to the second speech, instead of the third speech.

11. The computer-implemented method of claim 5, further comprising:
    receiving third input audio data corresponding to third speech;
    determining a first portion of the third speech was spoken by the first user;
    determining a second portion of the third speech was spoken by the second user;
    determining the first portion of the third speech is directed at the device; and
    determining the second portion of the third speech is directed at the first user.

12. The computer-implemented method of claim 5, further comprising:
    determining the second speech was spoken by the first user; and
    based on the second speech being spoken by the first user, determining the first output data to include a name of the first user.

13. A computing system comprising:
    at least one processor; and
    at least one memory comprising instructions that, when executed by the at least one processor, cause the computing system to:
    receive, from a device, first input audio data corresponding to first speech of a first user;
    determine the first speech is directed at the device;
    based on determining the first speech is directed at the device, receive, from a storage, a transcript of second speech, wherein the second speech was received prior to the first speech, and the transcript was stored based on the second speech being directed at a second user instead of the device;
    after receiving the transcript from the storage, determine first natural language data corresponding to the first speech updated to include at least one word from the second speech;
    perform natural language understanding (NLU) processing using the first natural language data to determine NLU output data comprising a first intent corresponding to at least one of the first speech and the second speech;
    based on the NLU output data, determine first output data responsive to at least one of the first speech and the second speech; and
    cause presentation of the first output data.

14. The computing system of claim 13, wherein the at least one memory further comprises instructions that, when executed by the at least one processor, further cause the computing system to:
- prior to receiving the first input audio data, receive second input audio data corresponding to the second speech;
- determine the second speech is directed at the second user instead of the device;
- determining information included in the second speech is usable to respond to speech directed to the device; and
- based on determining the information included in the second speech is usable to respond to the speech directed to the device, send the transcript of the second speech to the storage.

15. The computing system of claim 14, wherein the at least one memory further comprises instructions that, when executed by the at least one processor, further cause the computing system to:
- determine an entity referenced in the second speech; and
- determine the entity corresponds to an entity type capable of being processed using NLU processing, wherein determining the information included in the second speech is usable to respond to the speech directed to the device is based on the entity corresponding to the entity type.

16. The computing system of claim 14, wherein the at least one memory further comprises instructions that, when executed by the at least one processor, further cause the computing system to:
- determine usage data including a second transcript of third speech; and
- determine the second speech is semantically similar to the third speech, wherein sending the second speech to the storage is further based on the second speech being semantically similar to the third speech.

17. The computing system of claim 13, wherein the at least one memory further comprises instructions that, when executed by the at least one processor, further cause the computing system to:
- receive input image data corresponding to at least a first image representing the first user, wherein:
- determine the first speech is directed at the device is further based on the input image data.

18. The computing system of claim 13, wherein the at least one memory further comprises instructions that, when executed by the at least one processor, further cause the computing system to:
- based on determining the first speech is directed at the device, receive, from the storage, a second transcript of third speech, wherein the third speech was received prior to the first speech, and the second transcript was stored based on the third speech being directed at a third user instead of the device; and
- determine the first speech is semantically similar to the second speech, instead of the third speech, wherein the first natural language data includes the at least one word from the second speech, instead of the third speech based on the first speech being semantically similar to the second speech, instead of the third speech.

19. The computing system of claim 13, wherein the at least one memory further comprises instructions that, when executed by the at least one processor, further cause the computing system to:
- receive third input audio data corresponding to third speech;
- determine a first portion of the third speech was spoken by the first user;
- determine a second portion of the third speech was spoken by the second user;
- determine the first portion of the third speech is directed at the device; and
- determine the second portion of the third speech is directed at the first user.

20. The computing system of claim 13, wherein the at least one memory further comprises instructions that, when executed by the at least one processor, further cause the computing system to:
- determine the second speech was spoken by the first user; and
- based on the second speech being spoken by the first user, determine the first output data to include a name of the first user.

* * * * *